(12) United States Patent
Perinpanathan et al.

(10) Patent No.: US 6,944,166 B1
(45) Date of Patent: Sep. 13, 2005

(54) METHOD FOR CONTROLLING SERVICE LEVELS OVER PACKET BASED NETWORKS

(75) Inventors: Nishanthan M. T. Perinpanathan, Ottawa (CA); Ronald L Steeves, Kanata (CA); Vincent Y Chen, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 834 days.

(21) Appl. No.: 09/635,073

(22) Filed: Aug. 9, 2000

(51) Int. Cl.$^7$ ............................................. H04L 12/56
(52) U.S. Cl. ..................... 370/401; 370/352; 370/463; 709/226
(58) Field of Search ............................ 370/463, 395.2, 370/401, 352; 709/226; 379/114.03, 114.04, 379/114.05, 114.06, 114.07, 114.08, 114.09, 379/114.1

(56) References Cited

U.S. PATENT DOCUMENTS

| | | | |
|---|---|---|---|
| 5,381,467 A * | 1/1995 | Rosinski et al. ........ | 379/121.01 |
| 5,483,527 A * | 1/1996 | Doshi et al. ................. | 370/399 |
| 5,524,214 A | 6/1996 | Kurihara | |
| 5,574,724 A | 11/1996 | Bales et al. | |
| 5,774,533 A | 6/1998 | Patel | |
| 5,822,411 A * | 10/1998 | Swale et al. ........... | 379/114.22 |
| 6,148,337 A * | 11/2000 | Estberg et al. .............. | 709/224 |
| 6,154,778 A * | 11/2000 | Koistinen et al. ........... | 709/228 |
| 6,216,001 B1 * | 4/2001 | Ghirnikar et al. ......... | 455/435.1 |
| 6,292,479 B1 * | 9/2001 | Bartholomew et al. ..... | 370/352 |
| 6,345,038 B1 * | 2/2002 | Selinger ...................... | 370/230 |
| 6,373,931 B1 * | 4/2002 | Amin et al. ........... | 379/121.01 |

(Continued)

FOREIGN PATENT DOCUMENTS

EP 1 009 135 A2 6/2000

(Continued)

OTHER PUBLICATIONS

Rupp et al., "INDEX: A Platform for Determining How People Value the Quality of Their Internet Access". Department of Electrical Engineering & Computer Sciences, University of California at Berkeley, IEEE Proceedings, May 1998, pp. 85-90.*

(Continued)

*Primary Examiner*—Frank Duong
*Assistant Examiner*—Michael J. Moore

(57) ABSTRACT

An end user/station can dynamically control the service levels to/from a second user/station (i.e., locally or remotely controlling service levels). The service levels being provided over packet based networks (which may include Internet Protocol (IP) networks). Dynamic control may be provided for either or both of the service level (e.g., priority of transmission, class or type of service, bandwidth, etc.) and allocation of the costs associated with the service levels provided to users of the embodiments. In some embodiments, users, subscribing to a level of service (e.g., a set bandwidth and/or type of service) can request and obtain a different (e.g., better or worse) level of service (e.g., higher bandwidth access, higher priority of transmissions, etc.) for each call or session between the user and a called station over the packet network. Moreover, the level of service provided for the upstream direction (i.e., transmissions from the user) can be different from the level of service provided for the downstream direction (i.e., transmissions to the user). Further, the settlement procedures for the costs of these services can be allocated to the user, to the station called by the user, or a third station.

26 Claims, 10 Drawing Sheets

U.S. PATENT DOCUMENTS

| | | | |
|---|---|---|---|
| 6,442,138 B1 * | 8/2002 | Yin et al. | 370/232 |
| 6,542,521 B1 * | 4/2003 | Fjørtoft et al. | 370/522 |
| 6,614,781 B1 * | 9/2003 | Elliott et al. | 370/352 |
| 6,724,747 B1 * | 4/2004 | Arango et al. | 370/352 |
| 6,728,748 B1 * | 4/2004 | Mangipudi et al. | 718/105 |
| 6,754,180 B1 * | 6/2004 | Christie | 370/236 |
| 2001/0044845 A1 * | 11/2001 | Cloonan et al. | 709/226 |
| 2003/0169751 A1 * | 9/2003 | Pulkka et al. | 370/401 |
| 2004/0184446 A1 * | 9/2004 | Havens | 370/352 |

FOREIGN PATENT DOCUMENTS

| | | | | |
|---|---|---|---|---|
| EP | 001113629 A2 * | 7/2001 | | H04L 12/56 |
| WO | WO 98/38818 A2 | 9/1998 | | |
| WO | WO 98/49862 A1 | 11/1998 | | |

OTHER PUBLICATIONS

Goyal et al., "Integration of Call Signaling and Resource Management for IP Telephony", AT&T Laboratories, IEEE Network, May/Jun. 1999.*

Huitema et al., "An Architecture for Residential Internet Telephony Service", Telcordia Technologies, IEEE Network, May/Jun. 1999.*

Lakshmi-Ratan, Ramnath A., "The Lucent Technologies Softswitch-Realizing the Promise of Convergence", Bell Labs Technic Journal, Apr./Jun. 1999.*

* cited by examiner

METHOD FOR CONTROLLING SERVICE LEVELS OVER PACKET BASED NETWORKS

FIELD OF THE INVENTION

The present invention relates to the control of service levels and/or cost allocation of services over packet based networks which may include Internet Protocol (IP) networks.

BACKGROUND TO THE INVENTION

During the past several years, the increase in the use of packet networks (such as the Internet) has been tremendous. In fact, use of the Internet, in particular, has become, if not ubiquitous, certainly commonplace. The increased use, is due in part, to the amount of freely available information. Recently, there has also been an increased use of packet networks for commercial purposes.

In combination with the increased usage of these packet networks, the demand for the information provided on these networks has also increased. As a result of this increase in demand for information, users have noticed increasing delays in receiving their desired information. As is known, most of these networks, such as the Internet, transmit packets on a best effort basis. Techniques exist to increase best effort transmissions for unidirectional communications. However, no techniques are known to locally or remotely control service levels for bi-directional communications. For many uses (e.g., downloading articles, yesterday's sports scores, etc.) delays in receiving data which result from the best effort methodology coupled with the increased demand are frustrating but, to some extent, tolerable.

Further, the commonplace use of the Internet has fuelled an increase in the types of information that is available. Previously, the World Wide Web portion of the Internet was restricted to mostly text and photos. However, streaming audio and video, full motion animation and the like are now common place. These latter types of media are more sensitive to delays in transmission/reception.

Also gaining popularity is the use of packet networks for voice communication (e.g., use of the network for "telephone calls"). Due to the nature of live two way communication, delays in receiving packets of voice data are far more problematic than when downloading yesterday's sports scores.

While customers of network access providers (sometimes known as Internet Service Providers or ISPs) typically subscribe for a fixed amount of bandwidth having a fixed level of service (e.g., 56 kbps modem access, 1 Mbps DSL access, etc.), customers, especially those paying for so-called high speed or broadband access, are nevertheless frustrated when delays, resulting from network congestion, are experienced. These delays result from the best effort handling within the packet network of packets from or destined for these customers. Accordingly, despite the high quality link between the customer and their ISP, the customer receives, for example, "jerky" streaming video, or a VoIP call that, due to dropped or delayed packets, sounds sub-standard to the customer.

It has also been noted that many online retailers are now offering to prospective purchasers the ability to speak directly to a sales representative by selecting a button or the like on a web page. These prospective purchasers may, while viewing the web pages, tolerate delays in receiving requested information. However, these same delays often become intolerable due to the resulting interference with VoIP communications. Some schemes have attempted to address the problem by providing all packets emanating from a selected customer with priority handling. However, the costs associated with these schemes together with the dynamic and varying nature of a customer's use of their network access (e.g., delays may be tolerable in some cases and intolerable in other cases with switching between the two cases often happening in a single session) have demonstrated that these schemes are often unsatisfactory. Similar frustrating results occur when other data types are used.

Further, many potential customers consider that the costs associated with obtaining a high or priority level of service to be wasted when the party with which they are communicating does not subscribe to the same level of service. As a result, a customer, that is paying for the increased quality or level of service for packets emanating from the customer receives packets from the other party that have been handled with a much lower level service. As a result, the other party may be receiving packets from the customer on a timely basis (which may result, in a VoIP call, in high quality audio being received by the other party) while the "high priority" customer is receiving packets that have been delayed or even failing to receive some packets (which may result in a choppy and intolerable audio being received by the customer). This situation is often unsatisfactory.

Accordingly, it would be desirable to deliver access to the level of network connectivity (or quality of the connection to the network) that customers desire while addressing some of the access issues described above.

SUMMARY OF THE INVENTION

Advantageously, embodiments of the invention provide for dynamic control of either or both of the service level (e.g., priority of transmission, class or type of service, bandwidth, packet treatment, etc.) and allocation of the costs associated with the service levels provided to users.

In some embodiments of the invention, users, subscribing to a level of service (e.g., a set bandwidth and/or type of service) can dynamically request and obtain a different (e.g., better or worse) level of service (e.g., higher priority of transmissions, etc.) for each call or session between the user and another station (or network node) over a packet network. Moreover, the level of service provided for the upstream direction (i.e., transmissions from the user) can be different from the level of service provided for the downstream direction (i.e., transmissions to the user). Further, the settlement procedures for the costs of these services can be allocated to an account of the user, to an account of the station contacted by the user, or to an account of a third party.

Embodiments of the invention may be applicable to any type of data transmission including, for example, voice, video, general audio, general data and the like.

In one aspect of the invention there is provided a method for providing a subscriber with a requested level of service on a packet network, said method comprising: storing a subscription level of service for said subscriber; receiving a message from a user of said packet network requesting said requested level of service, said requested level of service different from said subscription level of service; responsive to said receiving of said message, allocating resources of said packet network corresponding to said requested level of service; and receiving data from, and transmitting data to, said subscriber using said resources allocated corresponding to said requested level of service.

In a further aspect of the invention there is provided a method of enabling a subscriber to use resources on a packet network, said resources indicative of a requested level of service, said method comprising: transmitting a request to said packet network indicative of said requested level of service, said requested level of service different from a subscription level service provided to said subscriber by a service subscription of said subscriber; responsive to said request transmitted, receiving notification of resources allocated on said packet network, said resources corresponding to said requested level of service; and transmitting data to, and receiving data from, said packet network using said resources allocated.

In a further aspect of the invention there is provided a method for providing communication over a packet network between a first station and a second station, said method comprising: establishing a first communication connection between said first station and said second station over said packet network, said first communication connection adapted to provide a first service level; establishing a second communication connection between said second station and said first station over said packet network, said second communication connection adapted to provide a second service level; and modifying said first connection such that said first connection is adapted to provide said second service level.

In a further aspect of the invention there is provided a media gateway in a packet network, said media gateway providing communication between a first station and said packet network and a second media gateway providing communication between a second station and said packet network, said media gateway adapted to: allocate resources for said first station, said resources forming a first connection providing communication from said media gateway over said packet network to said second media gateway, said first connection adapted to provide a first service level; transmit a request for communication with said second station, said request providing network connection information about said first connection and said first service level; receive a message providing network connection information about a second connection and a second service level, said second service level associated with said second connection, said second connection providing communication between said second media gateway and said packet network; modify said first connection to provide said second service level; transmit data received from said first station destined for said second station to said network address of said second media gateway using said first connection; and transmit data received from said second station destined for said first station to said network address of said first media gateway using said second connection.

In a further aspect of the invention there is provided a media gateway controller in a data network, said media gateway controller for establishing communication between a first media gateway and a second media gateway over a packet network, said first media gateway servicing a first station and said second media gateway servicing a second station, said media gateway controller adapted to: receive a request from said first media gateway, said request requesting a level of service for a connection for communication between said first media gateway and said second media gateway, an address for a second station and a first network address associated with said connection terminating at said first media gateway, said first station subscribing to a subscription level of service different from said level of service requested; transmit a communication request to said second media gateway, said communication request requesting said second media gateway allocate resources for communication between said second media gateway and said first media gateway over said packet network for said connection; receive from said second media gateway a network address associated with said connection terminating at said second media gateway; transmit to said first media gateway a response to said request, said response indicating a level of service to be provided to said first station in view of said service level requested; and said connection comprising an upstream connection for transmissions from said first media gateway to said second media gateway and a downstream connection for transmissions from said second media gateway to said first media gateway.

In a further aspect of the invention there is provided a computer readable media containing software for a media gateway in a packet network, said media gateway communicating with a first station and said packet network and a second media gateway communicating with a second station and said packet network, said computer readable media adapting said media gateway to: allocate resources to said first station, said resources forming a first communication connection providing communication between said media gateway and said packet network, said first communication connection adapted to provide a first service level; transmit a request for communication with said second station, said request providing network connection information about said first communication connection and said first service level; receive a message providing network connection information about a second communication connection and a second service level, said second service level associated with said second communication connection, said second communication connection providing communication between said second media gateway and said packet network; receive confirmation of modification of said first connection, said modification adapting said first connection to provide said second service level; transmit data received from said first station and destined for said second station using said first communication connection; and transmit data received from said second station and destined for said first station using said second communication connection.

In a further aspect of the invention there is provided a method of allocating costs associated with providing communication between a user of a packet network and said packet network, said method comprising: receiving from a station a request for a modification to a service level associated with a connection providing communication between said user and said packet network; responsive to said request, modifying said service level associated with said connection; receiving a settlement procedure from said station; and allocating costs associated with said modifying in accordance with said settlement procedure.

In a further aspect of the invention there is provided a method for providing communication services to a user of a packet network comprising: receiving a request from said user, said request indicating a service level and a settlement procedure; responsive to said request, determining a level of service to be provided to said user; allocating resources of said packet network responsive to said level of service determined; and allocating costs for said resources allocated in accordance with said settlement procedure.

In a further aspect of the invention there is provided a bridge in communication with a packet network, said bridge adapted to: establish a first connection with a first station over said packet network, said first connection adapted to provide a first service level; establish a second connection with a second station over said packet network, said second connection adapted to provide a second service level; and modify said first connection such that said first connection is adapted to provide said second service level.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood with reference to the following detailed description read in conjunction with the drawings, in which:

FIG. 3, comprising

FIG. 6, comprising

DETAILED DESCRIPTION

While many of the signal flows described herein relate to Media Gateway Control Protocol (MGCP) described in RFC 2705 available from the Internet Engineering Task Force (IETF), other signalling protocols such as, for example, H.323 available from the International Telecommunication Union (ITU), Session Initialization Protocol described in RFC 2543, Mar. 17, 1999 and available from the IETF, the Media Gateway Control (MAEGACO) and H.248 protocols available from the IETF and ITU, respectively, Network-based Call Signalling (NCS) described in "PacketCable™ Network-Based Call Signalling Protocol" available from Cable Television Laboratories, Inc., Distributed Call Signalling (DCS) described in a draft entitled "Architectural Considerations for Providing Carrier Class Telephony Services Utilizing SIP-based Distributed Call Control Mechanisms", June, 2000 and available from the IETF, and others could also be employed. The contents of each of these protocols is hereby incorporated herein by reference.

It should also be noted that while many of the two way communication links in the examples described herein relate to voice calls, the communication could just as easily be another type of media such as, for example, a video transmission, data transmissions, photos, animation, etc.

Figure 1:
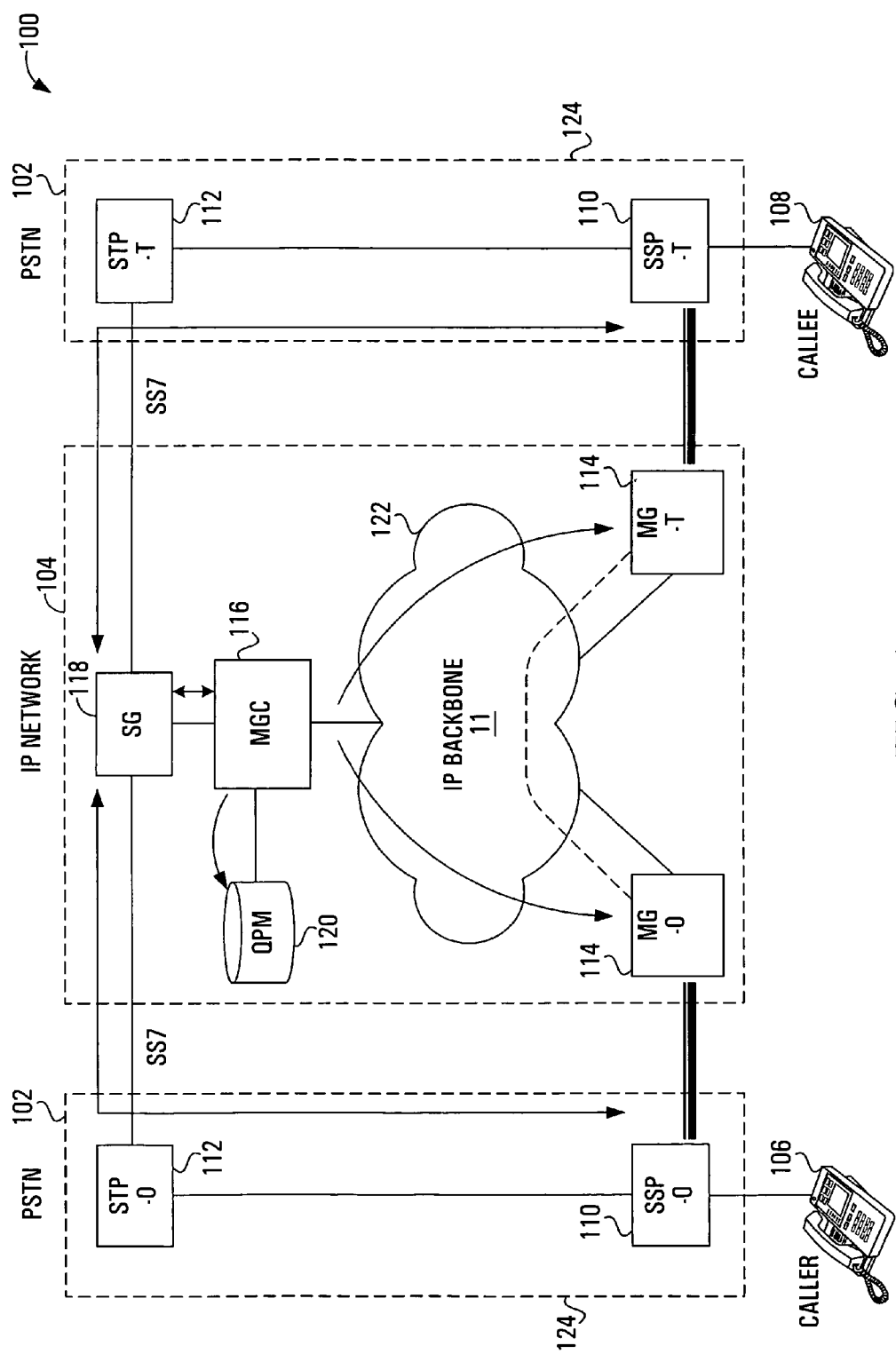
FIG. 1 is a schematic of a first system of voice and data networks embodying one aspect of the present invention.

FIG. 1 illustrates system 100 which includes an access network 102 communicating with a packet network illustrated as IP network 104. Access network 102 while illustrated as the Public Switched Telephone Network (PSTN)—a Signalling System #7 (SS7) network, access network 102 could equally be a digital subscriber line (DSL) network, a cable modem network, a local area network (e.g., Ethernet, token ring, etc.), a wireless network, etc.

Interposed between an originating/calling station 106 and a terminating/called station 108 is access network 102 and IP network 104. Calling station 106 and called station 108 may be implemented, for example, by a conventional handset (wired or wireless), a computer, or other data device (e.g., portable or notebook computers, wireless handheld computers, advanced wireless mobile stations, etc.), or a group of such devices.

As is known in the art, PSTN 102 includes Service Switching Points (SSPs) 110 and Signalling Transfer Points (STPs) 112. Each SSP 110 communicates within the PSTN 102 with an associated STP 112. Additionally, each SSP 110 communicates with IP network 104 through a media gateway (MG) 114. STPs 110 also communicate with IP network 104 through SS7 Signalling Gateway (SG) 118.

PSTN network elements (SSPs 110, STPs 112 and others), network elements of network 104, and data and signal flows that are associated with the originating/calling station 106 are identified by an "-o" or "o-" tag. Similarly, network elements, data and signal flows associated with the terminating/called station 108 are identified by a "-t" or "t-" tag.

IP Network 104, in addition to the MGs 114 and SG 118, also includes a Media Gateway Controller (MGC) 116 which communicates with SG 118 and Quality of Service (QoS) Policy Manager (QPM) 120. MGC 116 and MGs 114 communicate over IP backbone 122. IP backbone may be a conventional backbone including routers, switches, optical transport, etc., such as, for example, Nortel Networks' Optera™ Packet Core or Passport™ 15000 and 8600. MGC 116 and QPM 120 provide for centralized call control and resource management.

QPM 120 (also known in the art as a customer database) typically includes or maintains call set-up information, customer profiles, trunk features, routing or network topology data, authentication and authorization data, service level policies (described herein) and the like.

In overview, and without limiting the description herein, voice and data network 100 operates as follows. In this exemplary scenario, calling station 106 has subscribed to "premium" service (i.e., premium treatment of data packets) on IP network 104 and desires communication with called station 108 which has subscribed to relatively lesser service level on IP network 104 (hereinafter "standard" service—a best effort packet treatment). In this particular example, calling station 106 controls bi-directional service level through its subscription. That is, premium service is provided to/from any station in communication with calling station 106. (In an alternative embodiment, either of the stations may not subscribe to any service but may request services on per call basis—i.e., a subscription to standard service should be taken to include the situation where a station has no subscription at all.)

Calling station 106 dials the telephone number of called station 108. SSP-o 110, part of the originating Local Exchange Carrier (LEC-o) 124, collects the digits of the number dialled by calling station 106 and generates an SS7 ISDN User Part (ISUP) Initial Address Message (IAM). The IAM, which contains the Originating Point Code (OPC) of SSP-o 110, the Destination Point Code (DPC) of SSP-t 110, the calling number, the called number and the Circuit Identification Code (CIC) of a trunk connecting SSP-o 110 to MG-o 114, is transmitted to SG 118 via STP-o 112.

Upon receipt of the IAM message, SG 118 uses the information contained within the IAM message to determine the MGC 116 that will service the call. SG 118 then determines the IP addresses of MGC 116 associated with MG-o 114. MGC 116, on receipt of the packets from SG 118, queries QPM 120 to determine the level of service that is to be associated with the call. This determination includes admission control, resource/bandwidth availability, bandwidth control and policy management decisions. The policy management decisions include, for example, instructions for handling calls involving the stations communicating, in this case calling station 106 and called station 108. Policy management decisions also include information regarding the cost settlement procedures that can be implemented based on the stations involved in the call. QPM 120 has a data record for each station serviced by MGC 116. In this example, calling station 106 has subscribed for premium service while, in contrast, called station 108 has subscribed to standard service (or, alternatively, called station 108 has not subscribed for the premium service and, hence, is given standard service). As a result of this conflict (the conflict that calling station 106 desires all calls to have bi-directional communication at the premium service transmission rates, while called station 108 has only subscribed to the standard level of service), calling station 106 would, conventionally, be limited, at best, to receive data from called station 108 at the standard service level—the best effort treatment of packets from called station 108. The premium service of calling station 106 includes management policies (stored by QPM 120) which indicate that the premium service to which calling station 106 has subscribed requires, if possible, all communications involving calling station 106 (i.e., all packets to/from calling station 106) are to be provided at the premium service. Further, in this example, the premium service does not require any additional costs to be borne by called station 108 when it is upgraded, temporarily, to the premium service level (i.e., the premium service subscribed to by calling station 106 includes the service of upgrading, if necessary, other stations communicating with calling station 106 to the premium service level without incurring any additional costs to either station). If the premium service of calling station 106 provided for the upgrading of the service level of other stations but incurred additional costs, MGC 116 could commence an accounting of the costs associated with the upgrade of the service level of called station 108.

Regardless, MGC 116 will, on receipt of the results from the query of QPM 120, notify MG-o 114, using, for example, signalling messages described herein, to handle (e.g., mark and treat) data to and from called station 108 at the premium service level. Further, and unlike conventional systems, as a result of the policy management decisions of QPM 120, MGC 116 will also notify MG-t 114 that all transmissions to and from called station 108, for this call only, are to be handled as premium service level transmissions. It should be noted that MGC 116 communicates directly with MG-o 114 and MG-t 114 since both stations 106, 108 are serviced by MGs 114 that are serviced by a single MGC 116. However, as will be appreciated by those of ordinary skill in the art, a more generic scenario would entail MG-o 114 and MG-t 114 being serviced by two separate MGCs 116 and two separate QPMs 120 (one QPM 120 for each domain). Alternatively, a single QPM 120 could, if desired, service multiple MGCs 116.

Once connections are created on MG-o 114 and MG-t 114 and have been notified of the handling procedures, MGC 116 re-generates an IAM message which is transmitted to SSP-t 110 (i.e., part of the terminating LEC-t 124) via SG 118 and STP-t 112. The IAM message is then re-generated and transmitted to SSP-t 112 indicating that SSP-t 112 is to set-up a connection between SSP-t 110 and MG-t 114.

Upon receipt of the re-generated IAM, SSP-t 110 performs a readiness check and, if ready, an Address Complete Message (ACM) message is sent back to MGC 116 via STP-t 112 and SG 118. MGC 116, in response to the ACM received from SSP-t 110, instructs MG-o 114 to set up a premium bi-directional connection, and generates and transmits an ACM message to SSP-o 110 via SG 118 and STP-o 112.

The called station 108 is then conventionally notified of the incoming call and, when called station 108 answers (e.g., goes off-hook), an Answer Message (ANM) is generated by SSP-t 110 which is transmitted to MGC 116 via STP-t 112 and SG 118. Upon receipt of the ANM message, MGC 116 communicates with MG-o 114 and then generates and sends another ANM to SSP-o 110 via SG 118 and STP-o 112. As a result, a logical connection, having premium bi-directional service, between MG-o 114 and MG-t 114, over IP backbone 122, is established.

As a result of the foregoing, premium bi-directional service between calling station 106 and called station 108 is provided by system 100 across the IP network. This bi-directional premium service is provided despite the subscription to standard level service by called station 108. This upgrade of the service level is provided (following MGC 116 looking the quality policy from QPM 120 and instructing MG-t 114 to provide the upgrade—once an initial IAM message is received from SSP-o 112) to called station 108 and results in calling station 106 receiving data from called station 108 with premium packet treatment across the IP network. Similarly, called station 108 is provided with the ability to receive and transmit data with the premium packet treatment across the IP network. The premium packet treatment across the IP network is enforced by MGs 114 which, in part, arrange for the appropriate packet handling method (e.g., packet marking, etc.) and setting up the necessary bandwidth on the IP network side (in contrast to the station side of the connection).

As a result of implementing this embodiment, calling station 106 is assured that all communication (say, for example, voice communication) is of high quality regardless of the station with which calling station 106 wishes to communicate. Moreover, as the quality or level of service is determined and set by the MGC 116, based on the calling station's subscription information stored in QPM 120, the service level provided to the stations, unlike present systems, is dynamic.

Figure 2:
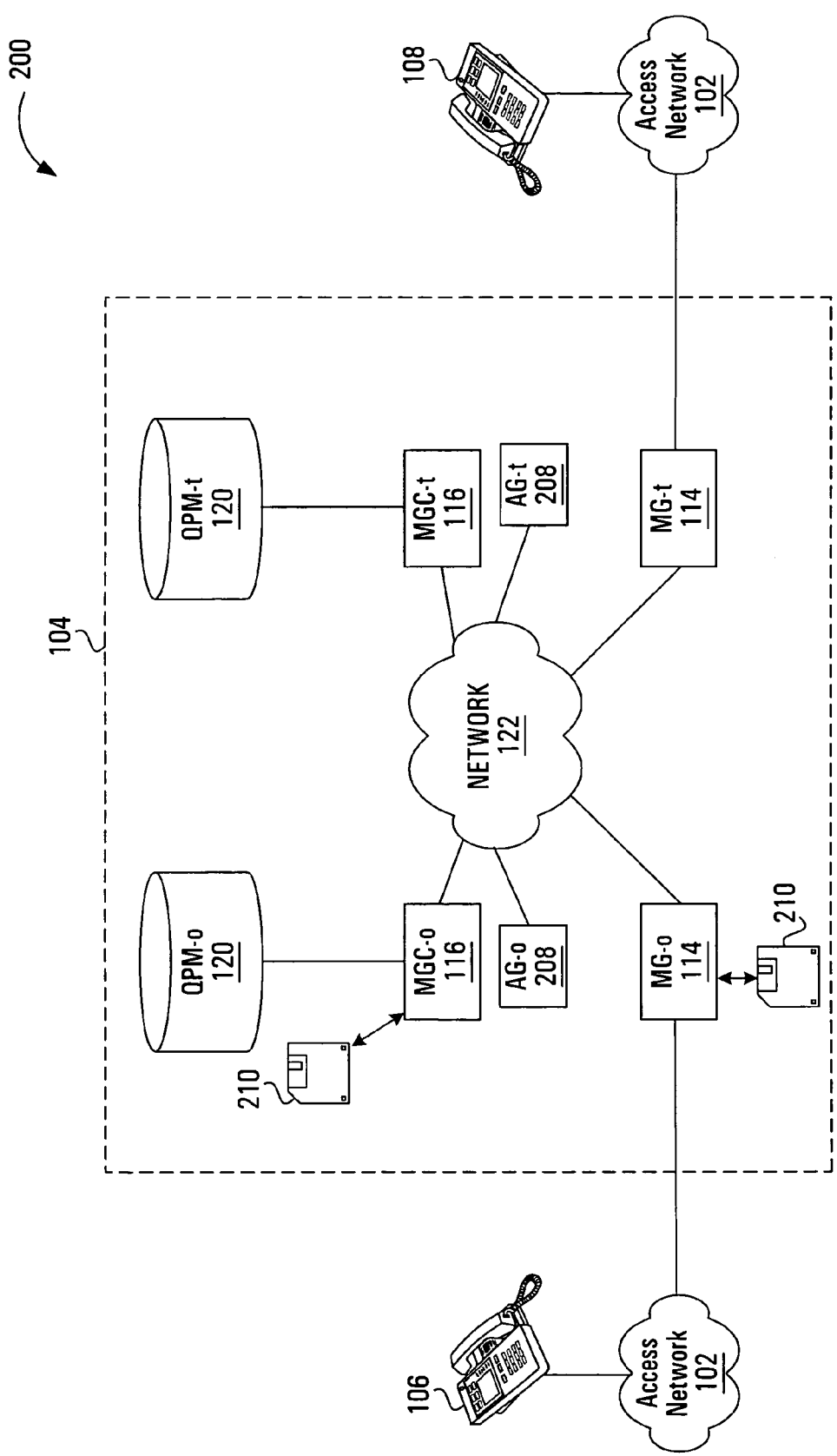
FIG. 2 is a schematic of a second system of voice and data networks embodying one aspect of the present invention.

FIG. 2 illustrates system 200—an alternative embodiment to system 100 of FIG. 1. Similar to system 100, system 200 includes a calling station 106 in communication with called station 108 and a data network such as IP network 104. Access network 102 communicates with the MGs 114 of IP network 104. Each MG 114, in addition to communicating with access network 102, communicates with a Media Gateway Controller (MGC) 116. Each MGC 116 also communicates with a QPM 120. Each MGC 116 is associated with a separate QPM 120. Accordingly, and in contrast to system 100 of FIG. 1, call control and management is distributed in system 200 between the plurality of MGCs 116 and QPMs 120 rather than being centralized in a single MGC 116/QPM 120 combination. As a person of ordinary skill in the art will appreciate, while FIG. 2 has been illustrated in a generic form with the originating and terminating stations serviced by separate MGs 114, MGCs 116, QPMs 120. Calling station 106 and called station 108 could equally be serviced by a single MG 114, MGC 116 and QPM 120. Further, each MG 114 could be serviced by a single MGC 116, QPM 120 pair. In a further embodiment, a single QPM 120 could service multiple MGCs 116.

Both MGCs 116 and MGs 114 are adapted to receive computer software or instructions from computer readable media 210. Computer readable media 210 may contain, for example, software, computer applications (including, for example, sub-routines corresponding to the signal flows illustrated in FIG. 3, 5 or 6), computer data and the like. While computer readable media 210 is illustrated as a computer diskette, it could equally be a tape, memory chip, or other removable or non-removable computer readable medium. Furthermore, the computer readable media 210 may be a remote media, such as the memory of a remote computer, and be downloaded over a suitable link such as over a network (e.g., network 104), dedicated data link, or the like. Alternatively, MGCs 116 and MGs 114 may be adapted to provide the functions described herein through installation of a combination of hardware and software in conventional MGCs and MGs.

Also illustrated in FIG. 2 are Accounting Gateways (AG) 208 which communicate with a respective MGC 116. AGs 208 enable tracking and call detail information including the allocation of costs incurred by the dynamic service levels enabled by system 200. MGs 114, MGCs 116 and QPMs 120 may be implemented using conventional MGs, MGCs and QPMs modified to implement the functions described herein.

Figure 3A:
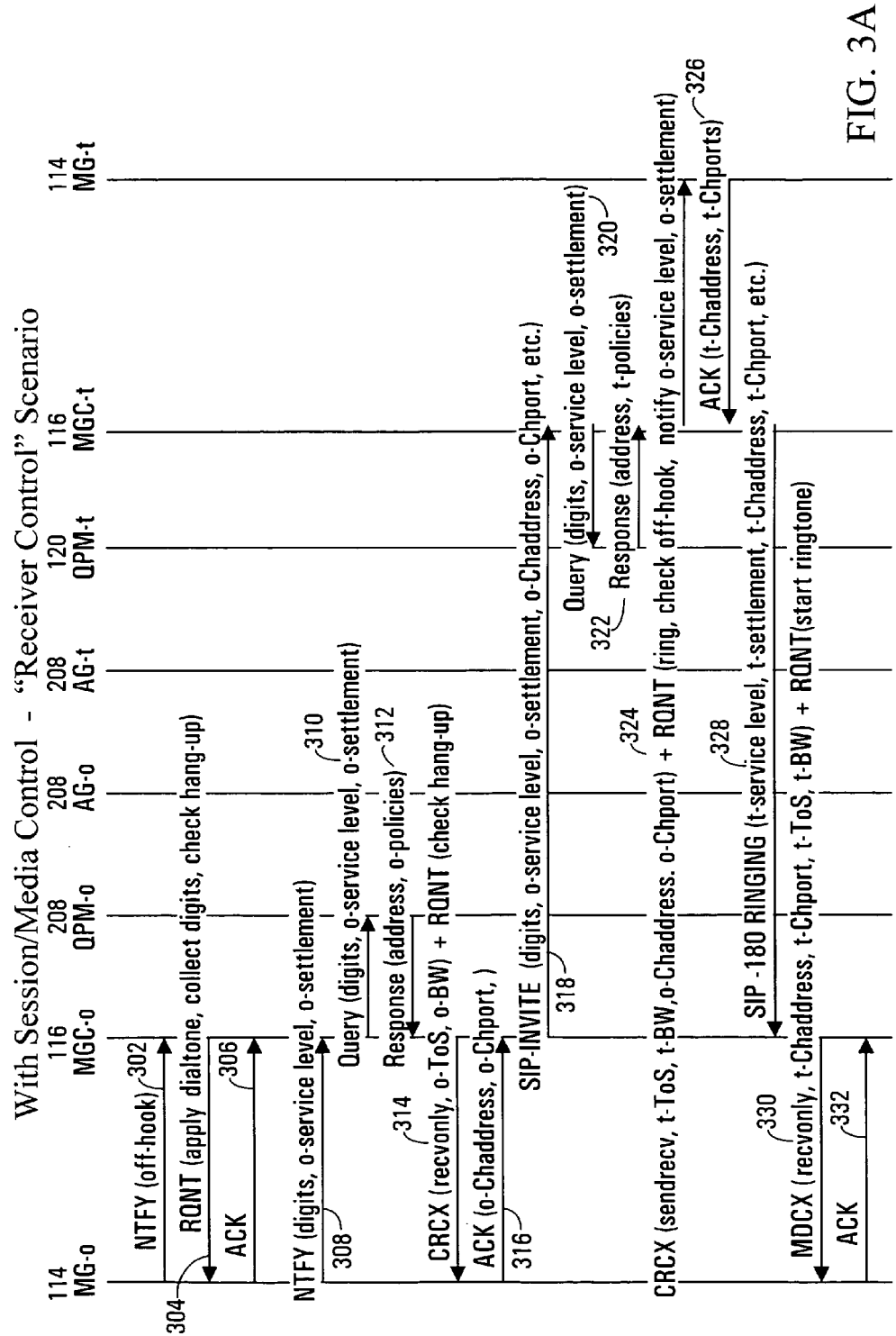
FIG. 3A and FIG. 3B, is a signal flow diagram of signals transmitted across the networks of FIG. 2.
Figure 3B:
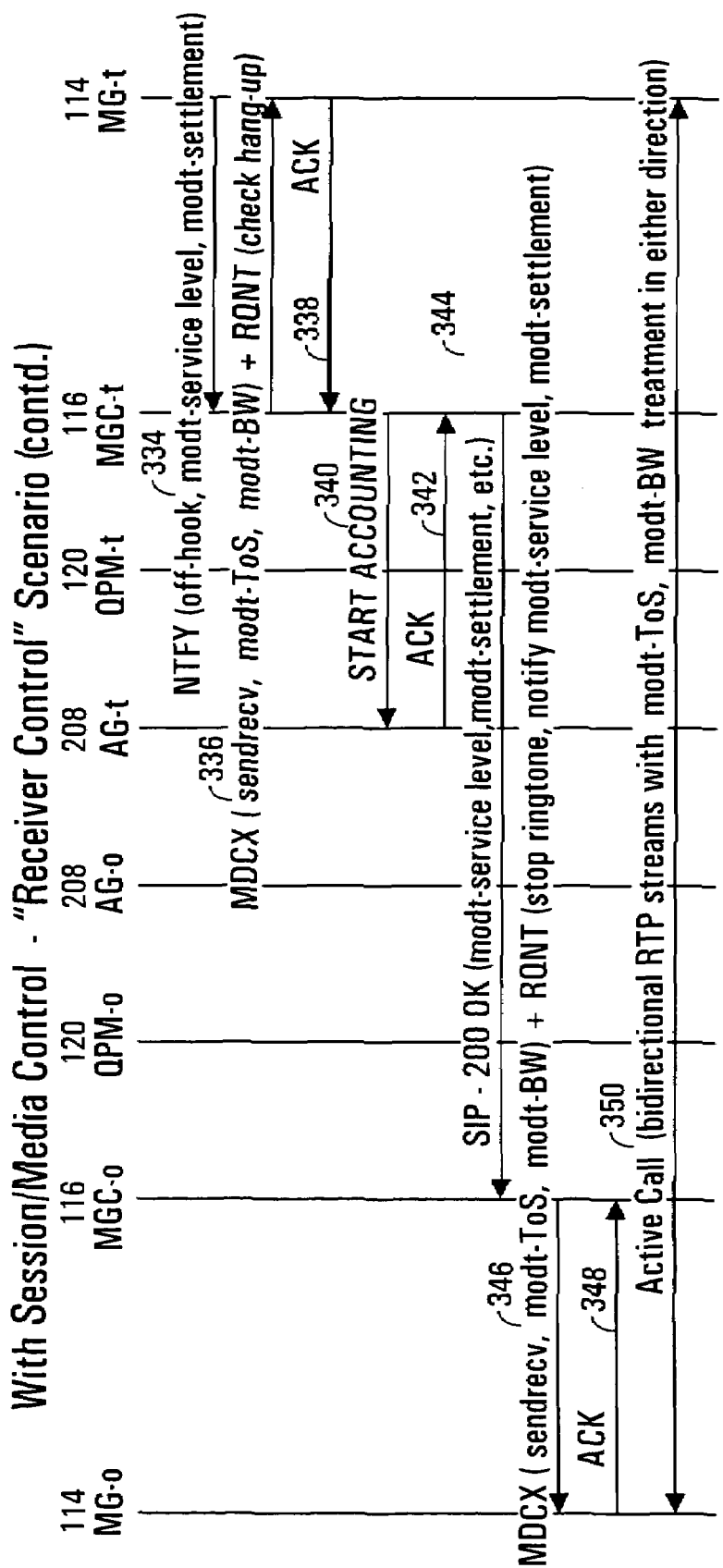

FIG. 3, comprising FIGS. 3A and 3B which have been separated due to space restrictions, illustrates exemplary signal flows transmitted within system 200 to enable dynamic service levels and is exemplary of a situation where called station 108 controls the service levels provided and cost settlement procedures used during the session for the communication session between called station 108 and calling station 106. The session or call is commenced in the example by calling station 106. The exemplary signal flows of FIG. 3 illustrate a calling station 106, having a standard level of service, attempting to initiate communication with a called station 108, having a different and premium level of service. Moreover, the premium level of service subscribed to by called station 108 includes providing upgrades to the service of other stations communicating with called station 108 (e.g., calling station 106). However, the exemplary signal flows of FIG. 3 also indicate a manual (or user initiated) request by called station 108 for a third level of service (e.g., ultra-premium service) different from either the standard or premium service levels subscribed to by calling station 106 and called station 108, respectively. This request for a third level of service indicates that the ultra-premium service is to be provided to both stations 106 and 108. Further, included in the request for ultra-premium service is a request by called station 108 indicating that the additional costs associated with providing ultra-premium service to both stations is to be paid for in accordance with the settlement procedure requested by called station 108. Accordingly, the signal flows illustrated in FIG. 3 are exemplary of service upgrades resulting from a customer's subscription information (i.e., an automatic upgrade) and service upgrades manually by a customer. As will be appreciated by those of ordinary skill in the art, each type of service upgrade (i.e., manual or automatic) could be used in isolation or, as illustrated, in combination.

When calling station 106 attempts to contact called station 108, MG-o 114 notifies MGC-o 116 that calling station 106 has gone off-hook by transmitting notification message (NTFY) 302. Responsive to this notification, MGC-o 116 transmits a request notification (RQNT) message 304 to generate or apply dial tone to calling station 106, collect the digits dialled (or network address requested) and check if calling station 106 has hung up. MG-o 114 transmits acknowledgement (ACK) message 306 to MGC-o 116 upon receipt of RQNT message 304 and confirmation of the application of dial tone, receipt of a dialled number (or, more generically, a network address) and that the calling station remains "on the line". Thereafter, MG-o 114 transmits NTFY message 308 which includes the number (or network address) requested by the calling station. Also optionally included in this message is a request by the calling station for a specified level of service (o-service level) and a cost settlement procedure (o-settlement). The opportunity for the calling station to request a specified level of service and/or a settlement procedure enables the calling station to dynamically request service levels and settlement methods. The calling station may be prompted for information relating to a requested service level or settlement procedure by conventional methods including, for example, dialled digits, an interactive voice response (IVR) system or a data entry field provided by a calling station's computer. In a further embodiment, some of the parameters forwarded to MGC-o 116 in NTFY message 308 may be determined by MG-o 114 based on identification of calling station 106. In this alternative embodiment, MG-o 114 may, based on the identification of calling station 106 (e.g., calling station ID), retrieve a stored service level and/or settlement procedure. This retrieved data may then be used in NTFY message 308.

The level of service (o-service level) which may be requested by the calling station could, for example, be a request for premium service despite the calling station's subscription to a standard level of service. The settlement procedure (o-settlement) which may be optionally requested by the calling station indicates a requested method of payment for the session (e.g., calling station pays, called station pays, or third party/station pays) for a uni-directional or bi-directional connection. For example, a student at the calling station attempting to retrieve video data of a required lecture stored on a university or college computer—the called station—may request that upload data transmissions (from the student to the university) be paid for by the student. However, the student may request that download data transmissions (from the university to the student) be paid for by the university. Alternatively, the student, having secured a scholarship from an academic foundation—a third party (i.e., a third station)—may request that the costs associated with data transmissions for this session between the student and the university be billed to the academic foundation. As a result of these requests for service level (o-service level) and settlement procedure (which may or may not be satisfied), the calling station has the ability to dynamically request services and/or settlement procedures which differ from the services and settlement procedures subscribed to by the calling station.

However, in this example, the service level and settlement procedures requested by calling station 106 are assumed to accord with the standard service level subscribed to by calling station 106.

Responsive to NTFY message 308, MGC-o 116 transmits a query message 310 to QPM-o 120 to determine the network address of the MGC-t 116 servicing called station 108 (based on the digits dialled by the calling station). Query message 310 also includes any service level and settlement procedure requests made by the calling station which are based, in part, on the settlement procedures requested. QPM-o 120 looks up a customer record which identifies the policies (o-policies) associated with calling station 106. The calling station's polices indicate the services to which the calling station is entitled. The policies may include, for example, service level parameter(s) (e.g., bandwidth, type of service, CODEC information), authorization information, duration limits, time during which service may be provided, maximum allowed limit, indications of whether (and to what extent) overriding the system parameters are allowable, disposition of calls, etc. For example, the calling station may have requested premium level service to be paid for by the calling station directly. However, based on the credit information available within QPM-o 120, the calling station may only be entitled to standard service. Alternatively, the calling station may have requested that premium service be provided and be billed to a called party or a third party account (i.e., an account of a third station) which may be useful in a variety of scenarios (e.g., collect calling). There may be policies stored in association with the calling station 106 which are particular to the called station 108 or a third party/station. This may be the case, for example, where the calling station 106 requests that a service upgrade be paid for by a third party/station. QPM-o 120 may determine, based on the request made, that the service and settlement procedures can or cannot be provided. Based on the determination made by QPM-o 120, a response 312 indicating the address of the terminating MGC-t 116 and the service and settlement procedure policies that may be implemented for the calling station 106 is transmitted to MGC-o 116.

Upon receipt of the response to its query of QPM-o 120, MGC-o 116 creates (e.g., sets up), initially, a receive-only connection on MG-o 114-CRCX 314. The receive-only connection, triggered by the MGC-o 116, is created temporarily and is later modified to a send and receive connection. The connection is initially created as receive-only so that ring tones, announcements, notifications and other relevant messages may be forwarded to the calling station 108. The connection is set to send/receive mode only when the far end network address (e.g., IP address) and port numbers for the media packets are known and made available.

The connection created is associated with a specific type of service (o-ToS) and bandwidth (o-BW) given the policies retrieved (which are based on the service level and settlement procedure requested) and transmitted by signals 310, 312. (Type of Service (ToS) has been renamed to DSfield by the IETF in RFC 2474, 1999, the contents of which are hereby incorporated herein. The diffserv architecture and usage of DSfield for packet treatment is described in RFC 2475, the contents of both of which are hereby incorporated herein by reference.) Alternatively, the type of service and bandwidth (o-ToS, o-BW) allocated to calling station 108 may initially be set to a default and low level of service to preserve network resources while the call is being set-up. In this alternative embodiment, additional resources would later be allocated to provide the desired communication connection (e.g., bi-directional Active Call 350). MGC-o 116 also transmits a notification request (RQNT) to MG-o 114 in an attempt to determine if the calling station 106 has hung-up. Upon creation of the connection with the selected o-ToS and o-BW, MG-o 114 transmits ACK 316 to MGC-o 116. ACK 316 informs MGC-o 116 of the connection address (o-Chaddress—e.g., the IP address) and port (o-Chport) of the connection provided for communication on MG-o 114.

Responsive to ACK 316, MGC-o 116 transmits to MGC-t 116 a Session Initialization Protocol (SIP)—Invite. In either case, the message is transmitted with the digits dialed (or network address requested by the calling station), the service level and settlement procedures requested by calling station 106 (o-service level, o-settlement) and the information pertaining to the network connection address and port (o-Chaddress, o-Chport) of the logical connection assigned for communication on MG-o 114.

SIP is a protocol that provides telephony services similar to H.323 and is a text-based protocol, similar to HTTP and SMTP, for initiating interactive communication sessions between users. Such sessions include voice, video, chat, interactive games, and virtual reality sessions. SIP is described in RFC 2543 published Mar. 17, 1999 by the IETF, the contents of which are hereby incorporated herein.

Responsive to SIP-Invite message 318, MGC-t 116 queries 320 QPM-t 120 to determine the network address of the MG-t 114 servicing called station 108 and the policies of the terminating/called station 108. The policies associated with the called station may be determined in part by the settlement procedures and service level requested by calling station 106 (i.e., o-service level and o-settlement). QPM-t 120, responsive to the query, returns the network address of MG-t 114 and, if possible, a terminating policy (t-policies) satisfying the calling station's request for service in response 322. T-policies returned by QPM-t 120 are then temporarily stored by MGC-t 116 for the duration of the call. For example, the calling station (e.g., operated by a student) may have requested that the called station (e.g., the student's university) transmit and receive data at premium service levels. The called station may or may not subscribe to the level of service requested by the calling station. Responsive to the address and policies returned by response 322, MGC-t 116 transmits a request to create a send and receive connection having an associated t-ToS and t-BW in CRCX message 324. CRCX message 324 also indicates the connection address and port (o-Chaddress, o-Chport) of the logical connection on MG-o 114. The t-ToS and t-BW are determined based on the policies returned to MGC-t 116 (i.e., t-policies) by QPM-t 120. MGC-t 116 also transmits a request for notification (RQNT) in message 324 requesting that an acknowledgement be transmitted by MG-t 114 once MG-t 114 has rung called station 108; determined when called station 108 has gone off-hook; and informed called station 108 of the service level and settlement procedure requests made by calling station 106. Once these elements have been satisfied, MG-t 114 transmits to MGC-t 116 ACK 326 which includes the connection address and port (t-Chaddress and t-Chport, respectively) assigned to this logical connection on MG-t 114.

Upon confirmation that the connection on MG-t 114 has been established (ACK 326), MGC-t 116 transmits a SIP-180 RINGING message 328 indicating the service level and settlement procedures available to called station 108 (where t-policies indicates, in part, the t-service level and t-settlement procedure and t-service level indicates, in part, t-ToS and t-BW), and the connection address and port assigned to the connection on MG-t 114.

In the example situation illustrated in FIG. 3, calling station 106 has requested a service level (e.g., standard service) which differs from the service level available to called station 108 (e.g., premium service). Further, in this scenario, t-policies of called station 108 indicate that calling station 106 be able to receive data at a level (e.g., having a ToS and BW) similar to the premium service level at which called station 108 is transmitting. As such, and responsive to message 328, a Modify Connection (MDCX) message 330 is generated which modifies the receive-only level of service of the connection created responsive to CRCX message 314. MDCX message 330 requests MG-o 114 modify the service level of the connection on MG-o 114 to the premium service level indicated by t-ToS and t-BW which are being made available by terminating/called station 108. Also provided to MG-o 114 by MDCX message 330 are the connection address and port to be used for communicating with MG-t 114. MGC-o 116 also requests notification (RQNT) of ring tones supplied to calling station 106. Once MG-o 114 applies ring tones, MG-o 114 transmits ACK message 332 to MGC-o 116.

In FIG. 3B, NTFY message 334 is transmitted to MGC-t 114 in response to called station 108 answering the call (e.g., off-hook condition). At this point, however, called station 108 also makes a further request for a different or modified service level (e.g., ultra-premium service) and/or cost settlement procedure. This request, which may be transmitted by a data transmission from the called station's computer, handset, voice commands, DTMF tones or the like, is represented by the modify service level (mod-t-service level) and modify settlement procedure (mod-t-settlement) fields.

Responsive to request 334, and if able to satisfy the request in whole or in part (in view of t-policies stored by MGC-t 116 or by querying QPM-t 120 again—although this is not illustrated), MGC-t 116 transmits MDCX message 336 to MG-t 114 indicating that the send and receive transmissions to/from called station 114 should be modified to a new ToS (mod-t-ToS) and/or BW (mod-t-BW). A request for notification message is also transmitted to MG-t 114 as part of message 336 and an ACK 340 received when the modification to the connection on MG-t 114 has been completed.

Since called station 108 has requested a service level different (e.g., higher or lower ToS, greater or lesser bandwidth, etc.) from the service level provided by the subscription of called station 108, called station 108, in this example, may wish to either pay for increased service or be credited for a lower level service. Consequently, MGC-t 116 transmits a Start Accounting message 340 to AG-t 208 which accounts for the use of a level of service being different from the level of service subscribed to by called station 108. Responsive to message 340, AG-t 208 transmits ACK message 342 to MGC-t 116.

In the example illustrated in FIG. 3, also forming part of the requested modified service level and settlement procedure made by called station 108 is a request to MGC-116 for a level of service and settlement procedure which is different from the level of service and settlement procedures currently provided to calling station 106. Accordingly, a SIP-200 OK message 344 (an indication that a request has succeeded) is transmitted by MGC-t 116 to MGC-o 116. Message 344 includes the modified service levels and settlement procedures (mod-t-service level, mod-t-settlement, respectively) requested by called station 108. Responsive to this request, MGC-o 116 transmits MDCX message 346 to MG-o 114 requesting that the connection previously created and modified, be further modified so that both send and receive transmissions (i.e., data transmitted to and from calling station 106) be transmitted with the modified ToS and BW (mod-t-ToS and mod-t-BW, respectively) requested by called station 108, and the appropriate settlement procedures be reflected as per mod-t-settlement. MDCX message 346 is ACK'ed by message 348 when the service levels have been implemented by MG-o 114.

From the foregoing, an Active Call 350 has been created with bi-directional real time transmissions being made available to both stations (e.g., calling station 106 and called station 108) that are provided with ultra-premium service (e.g., mod-t-ToS and mod-t-BW) as requested by called station 108. Moreover, the level of service eventually provided is different from the service levels initially requested by calling station 106 and implemented by MG-o 114. Further, the service levels that would have been provided to both stations (by virtue of t-policies), had called station 108 not made a manual request, have also been modified. The service levels (e.g. ToS) and bandwidth required for Active Call 350 are enforced over IP network 104 by MGs 114.

The exemplary messages illustrated in FIG. 3 demonstrate the ability to provide service levels and settlement procedures which differ from the levels and settlement procedures normally implemented as a result of both stations' subscriptions. Moreover, FIG. 3 illustrates the dynamic nature of the service levels and settlement procedures offered. For example, either station could, if desired, transmit a further request for connection modification. Such a request (similar to NTFY message 334) would generate a NTFY message to the requesting station's MGC 116 indicating the level of service and/or settlement procedure desired. This NTFY message could be generated and transmitted mid-session (i.e., during the communication session between the stations and subsequent to Active Call 350).

While the signal flows illustrated in FIG. 3 were described as being initiated at the request of calling party 106, the signal flows could also be initiated (i.e., triggered) on request of the called party 108 or a third party.

Figure 4:
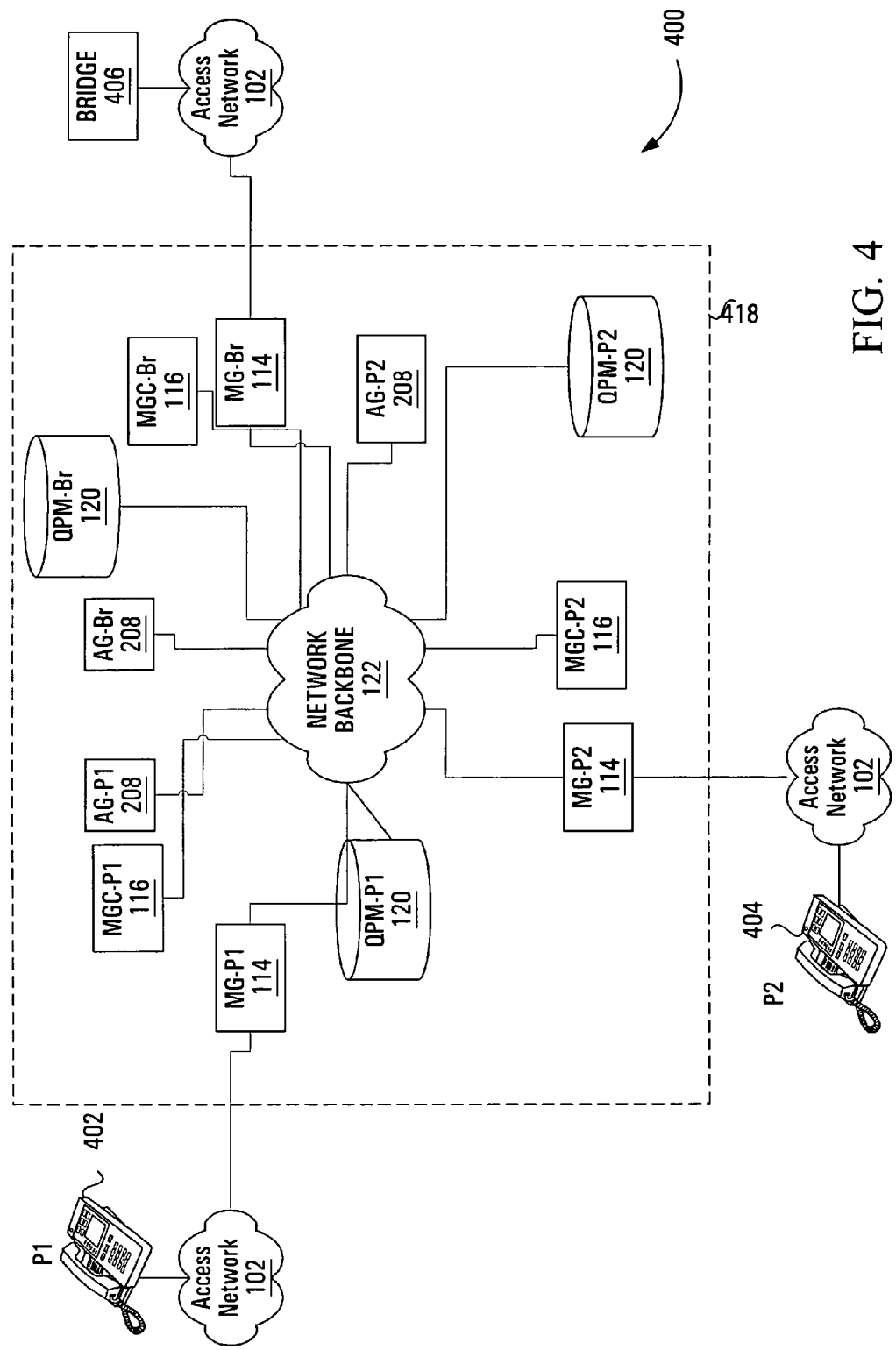
FIG. 4 is a schematic of a third system of voice and data networks, similar to the network of FIG. 2 and embodying a further aspect of the present invention.
Figure 5A:
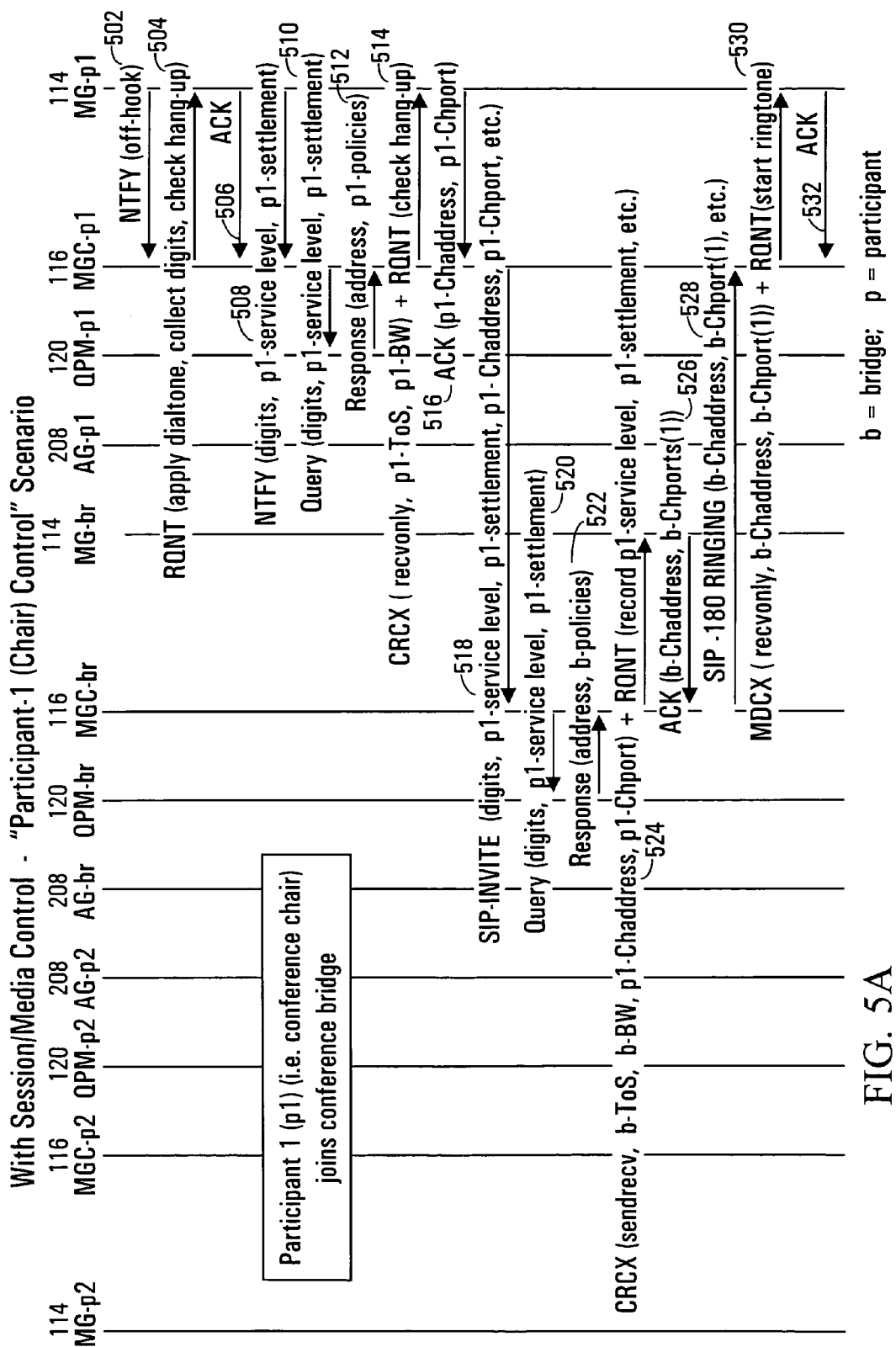
FIG. 5, comprising FIG. 5A, FIG. 5B
FIG. 5C is a signal flow diagram of signals transmitted across the networks of FIG. 4.
Figure 5B:
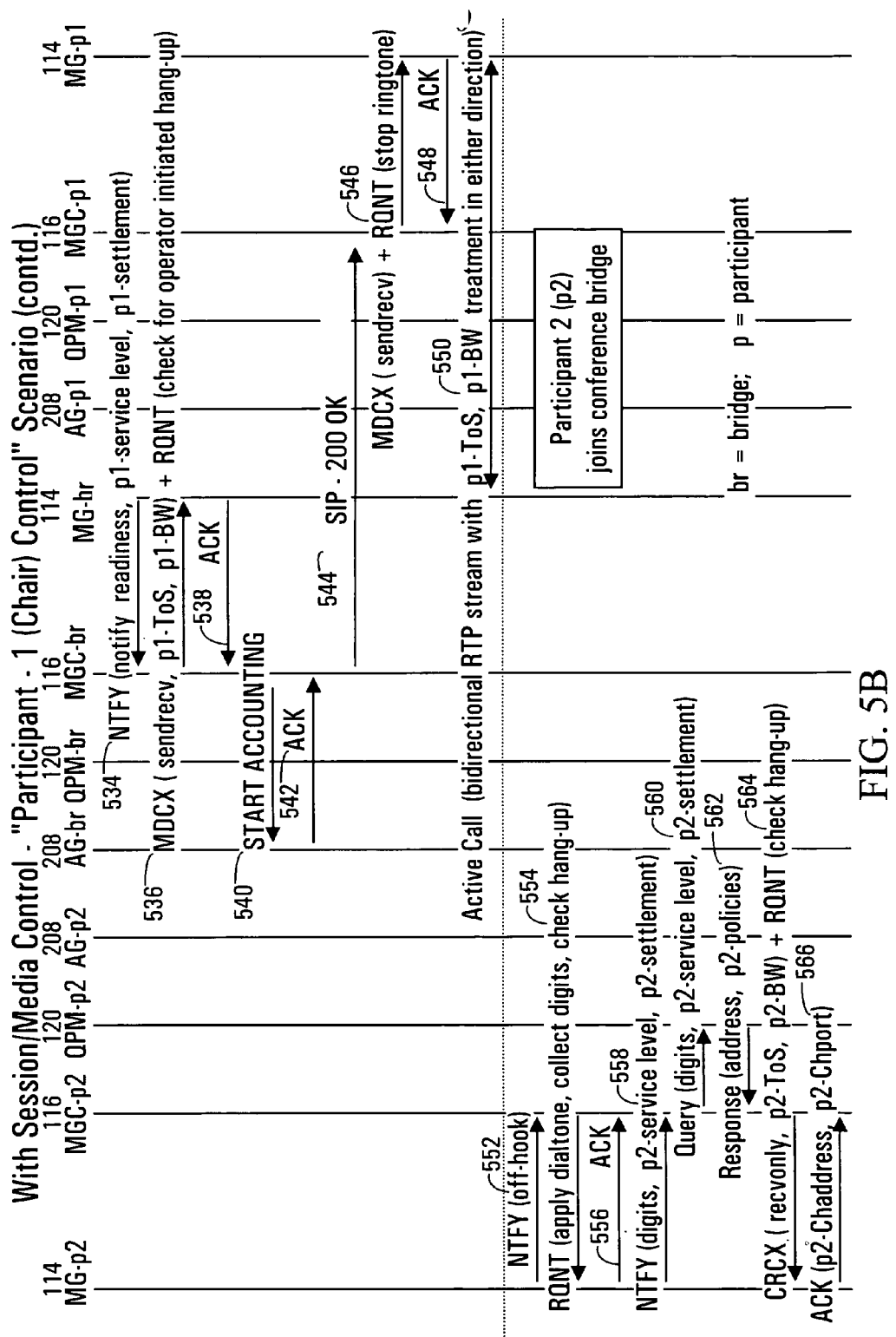
Figure 5C:
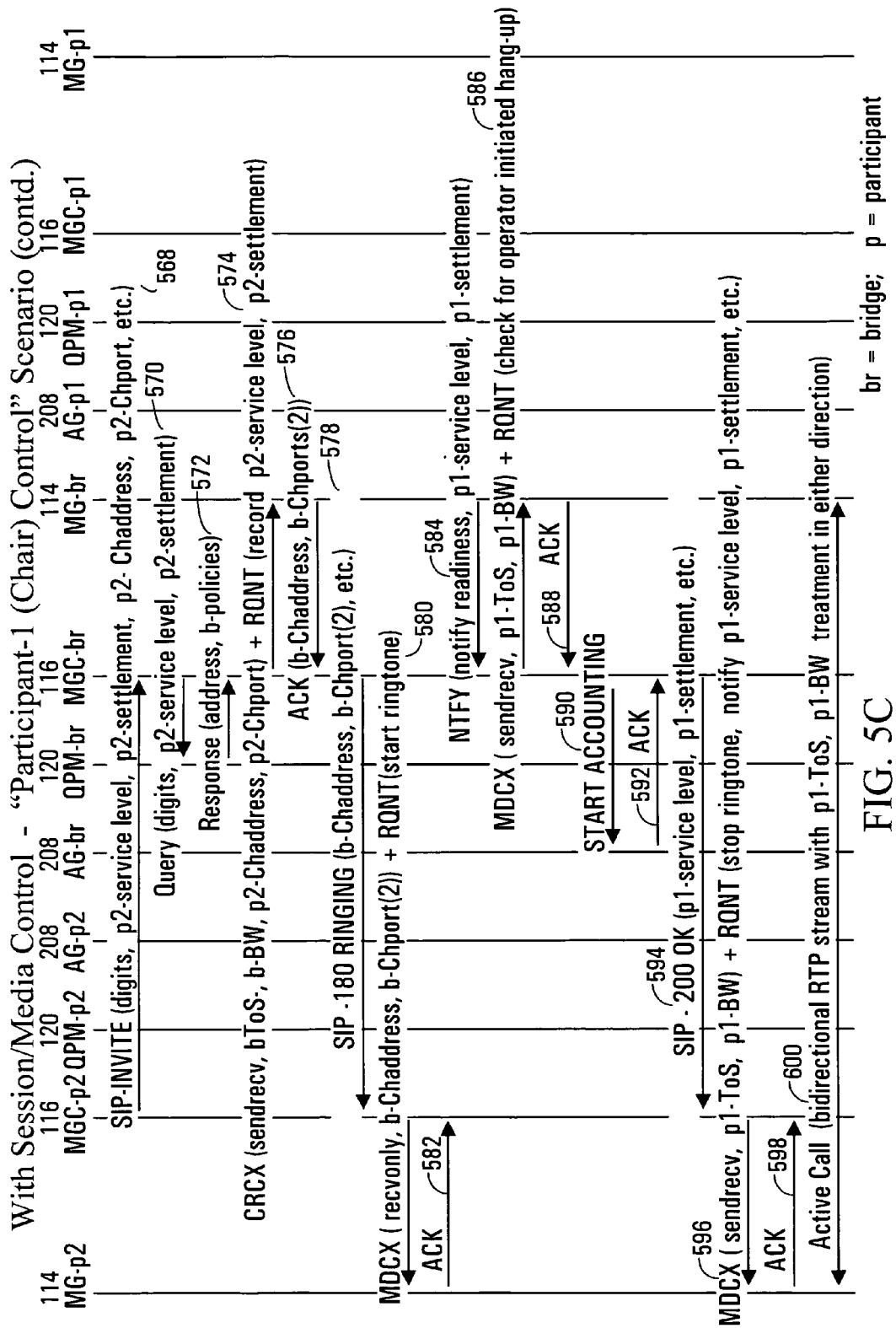

Illustrated in FIG. 4 is system 400—a modification of system 200. FIG. 5 (which is separated into FIGS. 5A, 5B and 5C due to space constraints) illustrates exemplary signal flows transmitted over system 400 to implement a multipoint to multipoint conference. System 400 comprises a first participant (p1) 402 communicating with packet network 418 via MG-p1 410. As with system 200, p1 402 is associated with MG-p1 114, MGC-p1 116, QPM-p1 120 and AG-p1 208. Similarly, a second participant (p2) 404, also communicating with data network 418, is associated with MG-p2 114, MGC-p2 116, QPM-p2 120 and AG-p2 208. Finally, a conventional audio bridge (Br) 406, also in communication with data network 418, is associated with MG-Br 114, MGC-Br 116, QPM-Br 120 and AG-Br 208. Conference facilities are provided by bridge 406 by having each station to the conference (e.g., p1 402 and p2 404) call into bridge 406.

In an alternative embodiment, MG-Br 114 and bridge 406 could be implemented as a single device such as, for example, Nortel Networks' Universal Audio Server that provides announcement and bridging functions.

The elements forming part of data network 418 (e.g., MGs 114, MGCs 116, QPMs 120 and AGs 208) communicate via network backbone 122. As with system 200 (FIG. 2), each station in the multipoint to multipoint conference described below (e.g., p1, p2 and Br) are illustrated as each being associated with a separate MG 114, MGC 116, QPM 120 and AG 208. However, one or more of the stations may be associated with a single one of MG 114, MGC 116, QPM 120 and AG 208 (e.g., all stations may be serviced by a single MG 114, MGC 116, QPM 120 and AG 208).

FIG. 5 illustrates the example situation where a conference chair (p1) desires a multipoint to multipoint conference using the facilities of bridge 406. For conciseness, only one additional station, p2, is shown as being joined to the conference. However, as will be appreciated by those skilled in the art, additional stations (e.g., p3, p4, . . . , px) could be joined using similar techniques described by messages 552–600 described in detail below. Further, only those signal flows within packet network 418 are described.

In the exemplary situation of FIG. 5, the conference chair, p1 402, desires multipoint to multipoint communication between participants in the conference. FIG. 5A is an example of chair control over end-to-end session service levels which are enforced by bridge 406. (In contrast, FIG. 3 illustrates a receiver or called station controlled scenario).

Moreover, the conference chair desires conference to be conducted with a specific service level, (p1-service level) and settlement procedure (p1-settlement). However, the remaining stations, bridge 406 and p2 404, . . . , px, subscribe to a service level (Br-service level, p2-service level, . . . , px-service level, respectively) which differ from the service level desired by the conference chair, p1 402.

For example, the conference chair/p1 402 may be a representative of a publicly traded company (e.g., a Chief Financial Officer) releasing the latest quarterly results to the public (e.g., p2 404) in a conference call using the facilities of bridge 406. However, to ensure that nothing is misheard by the remaining participants, chair/p1 402 desires that regardless of the service levels subscribed to by the remaining participants, all participants to the conference should be provided with the high quality service normally provided to the chair (i.e., p1-service level). Moreover, in view of the importance of these types of conferences to the health of the corporation, the chair is willing to pay for any necessary upgrades to the other participants for the duration of the conference call. Further, bridge 406 normally, or by default, subscribes to a service level (i.e., Br-service level) which is of lesser quality than that desired by chair/p1 402.

In view of the above-described scenario, the signal flows transmitted across system 400 and exemplary of one embodiment of the invention are described in detail below. With reference to FIG. 5, MG-p1 114 transmits NTFY message 502 to MGC-p1 116 indicating that the handset of chair/p1 402 has been placed off-hook. Responsive to NTFY message 502, MGC-p1 116 transmits RQNT message 504 requesting: that dial tone be applied to chair/p1 402; notification of any digits dialled (or network address requested) and collected; and that a check has been performed to ensure that chair/p1 402 has not placed the handset on-hook. Once these requests have been satisfied, MG-p1 114 transmits to MGC-p1 116 ACK message 506 followed by NTFY message 508 indicating the digits dialled, and the manually requested service level (p1-service level) and settlement procedure (p1-settlement). As indicated above, in the example situation illustrated in FIG. 5, chair/p1 402 requests that all participants be upgraded to p1-service level and the increased costs associated with this upgrade be allocated to chair/p1 402. This settlement procedure will be reflected in p1-settlement.

On receipt of NTFY message 508, MGC-p1 116 transmits query message 510 to QPM-p1 120 requesting the network address of the MGC 116 servicing the bridge associated with the digits dialled (i.e., the address of MGC-Br 116 which services Br 406). Also provided in query 510 is the service level (p1-service level) and settlement procedure (p1-settlement) requested by chair/p1 402. QPM-p1 120 determines, based on the information provided in query 510, the address of the MGC 116 servicing Br 406 (i.e., the address of MGC-Br 116) and the policies available to the subscriber, in this case chair/p1. The policies associated with p1 402 and the address of MGC-Br 116 are transmitted to MGC-p1 116 in response message 512.

Responsive to message 512, MGC-p1 116 determines the type of service (p1-ToS) and bandwidth (p1-BW) that should be provided to p1 402 in view of the p1-policy returned by QPM-p1 120. Subsequently, a connection on MG-p1 114 is established as a result of CRCX message 514. CRCX message 514 requests that MG-p1 114 establish a receive-only logical connection (i.e., MG-p1 114 is initially only able to receive data for p1 402). The receive only connection on MG-p1 114 enables MG-p1 114 to receive ring tones, announcements, etc., for p1 402 while bi-directional communication between the stations is established. Also included in message 514 is a request for notification to check if p1 402 has hung up. Upon creation of the requested logical connection, MG-p1 114 transmits ACK message 516 to MGC-p1 116 which includes the connection port and address (p1-Chport and chaddress-p1, respectively) assigned to the connection on MG-p1 114.

Once MGC-p1 116 receives ACK message 516, SIP-Invite message 518 is transmitted to MGC-Br 116 using the network address determined by QPM-p1 116. Message 518 includes the digits dialled by the chair/p1 402, the level of service requested (p1-service level), the settlement procedure requested (p1-settlement) and the connection port and connection address (p1-Chport, chaddress-p1) assigned to the connection, among other things, on MG-p1 114. The requested service level and settlement procedure (p1-service level, p1-settlement) together with the connection port and address (p1-Chport, chaddress-p1) are stored for later use by MGC-Br 116.

MGC-Br 116, responsive to message 518, transmits a query message 520 to QPM-Br 120 requesting the network address of the MG 114 servicing the station associated with the number dialled (i.e., the network address—e.g., IP address—of MG-Br 114 which services bridge 406). Also forming part of query message 520 is the service level and settlement procedure requested by p1 402. In response to this query, QPM-Br 120 provides the network address requested and the policies of the bridge (br-policies) 522. The bridge policies, in this exemplary situation, provide a default level of service (br-service level and Br-settlement, respectively) different from the level of service requested by p1 402. Consequently, as a result of CRCX message 524, a logical connection is initially created, for both the sending and receipt of data to/from bridge 406 that provides bridge 406 with a ToS and BW that is commensurate with the default bridge policies returned by QPM-Br 120 (i.e., Br-ToS and Br-BW). CRCX message 524 also indicates to MG-Br 114 the address (chaddress-p1) and port (p1-Chport) to use for communicating with MG-p1 114. The default service level of bridge 406 is initially implemented (rather than the service level requested by chair/p1 402) so that authorization of the chair's requests can be made. While authorization is ongoing, the default bridge policies are enforced. CRCX message 524 also indicates the connection address and port (chaddress-p1, p1-Chport) of the logical connection on MG-p1 114. Also forming part of message 524 is RQNT message which requests that MG-Br 114 record the service level and settlement procedure requested by the chair/p1 402 and authorize the chair's request. Responsive to the creation of the desired connection, MG-Br 114 responds to MGC-Br 116 with ACK message 526 which includes the port and address assigned to the logical connection on MG-Br 114 (i.e., Br-chport(1) and Br-chaddress, respectively). As will be appreciated by those of ordinary skill in the art, a bridge, such as bridge 406, provides multipoint to multipoint communication by linking each of the ports used during the conference (each port being assigned to a connection which provides for communication between the bridge and a participant to the conference). Accordingly, for each participant to the exemplary multipoint to multipoint conference illustrated in FIG. 5, bridge 406 will have a separate logical connection created. Accordingly, MG-Br 114 will assign a separate connection port to each of the participants in the conference. Accordingly, the first port assigned to the teleconference, which in the exemplary scenario is assigned to p1 402, is designated chport(1). The second port, as described below, is designated chport(2).

MGC-Br 116, assured that a connection has been assigned for bridge 406, issues a SIP-180 RINGING message 528 to MGC-p1 116. Message 528 includes the connection address and port (Br-chaddress, Br-chport(1)) assigned on MG-Br 114. Responsive to message 528, MGC-p1 116 issues MDCX message 530 to MG-p1 114. Message 530 indicates to MG-p1 114 the address and port assigned to the connection on MG-Br 114 (Br-chaddress, Br-chport(1)). In addition, message 530 includes a RQNT message which instructs MG-p1 114 to start ringing p1 402. Once ringing has commenced, MG-p1 114 transmits ACK message 532 to MGC-p1 116.

Now MG-Br 114 transmits NTFY message 534 to MGC-Br 116 indicating the service level and settlement procedures (i.e., p1-service level, p1-settlement requested earlier by p1 402). At this point, MGC-Br 116, using this service level and settlement procedure, transmits message 536 to MG-Br 114 requesting that the initial connection on MG-Br 114 be upgraded, in both directions, to the level of service implemented by MG-p1 114 (i.e., upgraded to p1-ToS and p1-BW). Message 536 indicates the conference chair's preference which is then used to control the MG-Br 114 and the MGs of all other participants (i.e., MG-p1, MG-p2, . . . , MG-px). It should be noted that if, p1 402 had not requested the service level and settlement procedure (i.e., p1-service level, p1-settlement), NTFY message 536 would include the service level and settlement procedure actually subscribed to by bridge 406 (i.e., the bridge's default subscription). Message 536 further includes an RQNT message requesting notification if the bridge 406 has failed (e.g., the bridge is hung up by the operator, other controlling devices, etc.). Once the send and receive connection on MG-Br 114 has been upgraded to p1-ToS and p1-BW, MG-Br 114 responds with ACK message 538.

It should be noted, and persons of ordinary skill in the art will appreciate, the send and receive connection on MG-Br 114 is allocated the bridge's default service level (i.e., Br-ToS and Br-BW) unless the chair or another authorized participant or party (i.e., a party to the conference or a third party) indicates an alternate service level to use for a portion or the entire conference session.

Once MGC-Br 116 receives ACK message 538, START ACCOUNTING message 540 is transmitted to AG-Br 208 to commence accounting for the conference services provided (i.e., enforced) by bridge 406. The accounting takes into account, amongst other factors, the bandwidth allocated (p1-BW) and type of service (p1-ToS) by MG-Br 114. Service-level p1 and p1-settlement (and all associated parameters) may also be included in message 540. Once accounting has commenced, AG-Br 208 replies to MG-Br 114 with ACK 542. On receipt of ACK 542, MG-Br 114 issues a SIP-200 OK message 544 to MGC-p1 116. This results in MGC-p1 116 issuing MDCX and RQNT message 546 to MG-p1 114. The MDCX portion of message 546 requests that the presently receive only connection on MG-p1 114 be modified to a send and receive connection. The RQNT portion of message 546 indicates that the ring tone applied to p1 402 should cease. Once the connection has been modified and the ring tone has ceased, in accordance with message 546, MG-p1 114 transmits ACK 548 to MGC-p1 116.

As a result of the foregoing, an active call 550 exists which is a bi-directional stream of data, and allocated an amount of bandwidth equal to p1-BW and assigned to the type of service indicated by p1-ToS. Accordingly, data transmitted from p1 402 destined for bridge 406 will be received by MG-p1 114. MG-p1 will then forward this data to MG-Br 114 using Br-chaddress and Br-chport(1). The data received by MG-Br 114 at Br-chaddress and Br-chport (1) will then be forwarded to bridge 406 as intended. Similarly, data from bridge 406 destined for p1 402 will be transmitted to MG-Br 114. This data will then be forwarded to MG-p1 114 by MG-Br 114 using chaddress-p1 and p1-Chport. On receipt of data on the connection identified by chaddress-p1 and p1-Chport, MG-p1 will forward this data to p1 114. As a result of the transmission of messages 502–550, a bi-directional connection having the service level and settlement procedures requested by chair/p1 402 has been established between chair/p1 402 and bridge 406.

Messages 552–600 set up a bi-directional connection between p2 404 and bridge 406 having the service levels (p1-service level with p1-ToS, p1-BW) requested by chair/p1 402 despite p2 404 subscribing to a different (e.g., lower) service level (p2-service level with p2-ToS and p2-BW). To offer p2 404 the service levels requested by chair/p1 402, the service level (p1-service level) and settlement procedures (p1-settlement) requested by chair/p1 are used.

Messages 552–582 are similar to messages 502–532. MG-p2 114 transmits NTFY message 552 to MGC-p2 116 indicating that the handset of p2 404 has been placed off-hook. Responsive to NTFY message 552, MGC-p2 transmits RQNT message 554 requesting: that dial tone be applied to p2 404; notification of any digits dialled (or network address requested) and collected; and that a check has been performed to ensure that p2 404 has not placed the handset on-hook. Once these requests have been satisfied, MG-p2 114 transmits to MGC-p2 116 ACK message 556 followed by NTFY message 558. NTFY message 558 indicates the digits dialled, the service level (p2-service level) and settlement procedure (p2-settlement) requested. As indicated above, in the example situation illustrated in FIG. 5, chair/p1 402 requests that all participants be upgraded to p1-service level and the increased costs associated with this upgrade be allocated to chair/p1 402 account.

On receipt of NTFY message 558, MGC-p2 116 transmits query message 560 to QPM-p2 120 requesting the network address of the MGC 116 servicing the conference bridge 406 (i.e., the address of MGC-Br 116 which services Br 406). Also provided in query 560 is the service level (p2-service level) and settlement procedure (p2-settlement) requested by p2 404. QPM-p2 120 determines, based on the information provided in query 560, the address of the MGC 116 servicing Br 406 (i.e., the address of MGC-Br 116) and the policies available to the subscriber, in this case p2. The policies associated with p2 404 and the address of MGC-Br 116 are transmitted to MGC-p2 116 in response message 562.

Responsive to message 562, MGC-p2 116 determines the type of service (p2-ToS) and bandwidth (p2-BW) that should be provided to p2 404 in view of the p2-policy returned by QPM-p2 120. Subsequently, a connection on MG-p2 114 is established as a result of CRCX message 564. CRCX message 564 requests that MG-p2 114 establish a receive-only logical connection (i.e., MG-p2 114 is initially only able to receive data for p2 404) with the indicated ToS and BW (p2-ToS, p2-BW, respectively). Also included in message 564 is a request for notification as to whether p2 404 has hung up. Upon creation of the requested logical connection, MG-p2 114 transmits ACK message 566 to MGC-p2 116 which includes the connection port and address (p2-Chport and p2-chaddress, respectively) assigned to the connection on MG-p2 114.

Once MGC-p2 116 receives ACK message 566, SIP-Invite message 568 is transmitted to MGC-Br 116 using the network address determined by QPM-p2 116. Message 568 includes the digits dialled by the p2 404, the level of service requested by p2 (p2-service level), the settlement procedure requested (p2-settlement) and the connection port and connection address (p2-Chport, p2-chaddress) assigned to the connection on MG-p2 114.

MGC-Br 116, responsive to message 568, transmits a query message 570 to QPM-Br 120 requesting the network address of the MG servicing the bridge associated with the number dialled (i.e., the network address of MG-Br 114 which services bridge 406). Also forming part of query message 570 is the service level and settlement procedure requested by p2 404. In the exemplary embodiment, bridge 406 will record each participant's requested service level and settlement procedure but only enforce (i.e., provide): (a) the chair's service level/settlement procedure; (b) the service level/settlement procedure of a participant or third party that has been authorized; or (c) the default bridge service level/settlement procedure.

In response to query 570, QPM-Br 120 provides the network address requested and the policies of the bridge (br-policies) 572. The bridge policies, in this exemplary situation, provide a level of service (Br-ToS and Br-BW, respectively) different from the level of service requested by p2 404. Consequently, as a result of CRCX message 574, a logical connection is initially created, for both the sending and receipt of data, on MG-Br 114 with a ToS and BW that is commensurate with the bridge policies returned by QPM-Br 120 (i.e., Br-ToS and Br-BW). CRCX message 574 also indicates to MG-Br 114 the address (p2-chaddress) and port (p2-Chport) to use for communicating with MG-p2 114. Also forming part of message 574 is RQNT message which requests that bridge 406 record the service level and settlement procedure requested by the p2 404. Responsive to the creation of the desired connection, MG-Br 114 responds to MGC-Br 116 with ACK message 576 which includes the port and address assigned to the logical connection on MG-Br 114 (i.e., Br-chport(2) and Br-chaddress, respectively).

MGC-Br 412, assured that a connection has been assigned on MG-Br 114, issues a SIP-180 RINGING message 578 to MGC-p2 116. Message 578 includes the connection address and port (Br-chaddress, Br-chport(2)) to be used by MG-p2 114 for communicating with MG-Br 114. Responsive to message 578, MGC-p2 116 issues MDCX message 580 to MG-p2 114. Message 580 indicates to MG-p2 114 the address and port assigned to the connection on MG-Br 114 (Br-chaddress, Br-chport(2)). In addition, message 580 includes a RQNT message which instructs MG-p2 114 to start ringing p2 404. Once ringing has commenced, MG-p2 114 transmits ACK message 582 to MGC-p2 116.

NTFY message 584 transmitted by MG-Br 114 to MGC-Br 116 notifies MGC-Br 116 of the state of readiness, the service level and settlement procedures being requested by bridge 406. Responsive to message 584, MGC-Br 114 requests that the bi-directional connection on MG-Br 114 for communication with p2 404 be upgraded to the service levels requested by chair/p1 402 (i.e., p1-ToS, p1-BW). This request is made by MGC-Br 114 transmitting an MDCX message 586 and a RQNT message which requests notification if bridge 406 hangs up (e.g., by an operator, etc.). Once the connection has been upgraded, MG-Br 114 transmits ACK 588 to MGC-Br 116.

Responsive to ACK 588, MGC-Br 116 requests that AG-Br 208 to start accounting for the costs associated with the upgrading connection on MG-p2 114. This accounting commenced by START ACCOUNTING message 590 is in addition to the accounting commenced by message 540 for connection to p1 402. AG-Br 208 responds to MGC-Br 116 with ACK 592.

In response to ACK 592, MGC-Br 116 transmits SIP-200 OK message 594 to MGC-p2 116. However, despite the service levels requested p2 404 (i.e., p2-service level), message 594 indicates that the service level to be provided to p2 404 be modified to the service level requested by chair/p1 (i.e., p1-service level). Moreover, any additional costs (or credits) are to be accounted in accordance with the settlement procedures requested by chair/p1 402 (i.e., p1-settlement).

Upon receipt of message 594, MGC-p2 116 transmits message 596 which instructs MG-p2 114 to modify the connection on MG-p2 114 to a send and receive connection having the service levels requested by chair/p1 402 as indicated by p1-ToS and p1-BW. Message 596 also includes a RQNT message which instructs MG-p2 114 to cease the ring tone on p2 404. Once these instructions have been performed, MG-p2 transmits ACK 598 to MGC-p2 116.

As a result of the foregoing, it will be appreciated that bridge 406 requests an upgrade in each participant's service level, if necessary, so as to enforce the service level requested by chair/p1 402. As a result of these requests MGs 114 (i.e., MG-Br, MG-p1, MG-p2, . . . ) enforce the authorized service level which was requested by chair/p1 402.

As a consequence of messages 550–598, an Active Call 600 exists which allows for bi-directional communication between bridge 406 and p2 404 having the service level requested by chair/p1 (p1-service level). Accordingly, Active Calls 550 and 600 result in a multipoint to multipoint conference between all participants (only p1 and p2 are shown) having the service levels requested by the chair and any additional costs accounted for through implementation of the settlement procedures requested by the chair/p1 402.

As will be appreciated, additional stations to the multipoint to multipoint conference could be added by repeating signals 552–600 for each additional station. Moreover, chair/p1 402 could, by transmitting a new NTFY message 508 request that the service levels or settlement procedures implemented be altered for a single participant, more than one participant or all participants. Similarly, there is also nothing to prevent one of the participants or even a third party (i.e., a non-participant) other than the chair (e.g., p2 404) from transmitting a NTFY message similar to message 508 also requesting that the service levels or settlement procedures be altered for a single participant, more than one participant, or all participants.

The service levels and settlement procedures requested by p1 402 (p1-service level, p1-settlement) may be different for different participants. For example. In the situation described above (a CFO chairing a conference call reporting on quarterly results) the chair may wish for the services provided to individual investors and the press be upgraded with costs being borne by the chair while the service levels provided to analysts of institutional investors being left alone or upgraded with costs of any upgrade to the service provided to institutional investors being borne by the institutional investors. In this case chair/p1 would request the bridge record and apply the chair's service level and settlement procedures for certain participant's only while the bridge's default service level/settlement procedure would be implemented for the remaining participants for example.

Further, in the example of FIG. 5 the service levels provided for each direction of the bi-directional connections of Active Calls 550 and 600 are equivalent to each other.

However, it may be the case that the chair of the conference will be transmitting, for example, video data, while only receiving voice data from the remaining participants. Accordingly, the connections created and modified by the various CRCX and MDCX messages could provide for transmissions from chair/p1 402 to the remaining participants (e.g., p2) having a very high service level (e.g., high priority ToS and high BW) while transmissions to chair/p1 could have the same or different service level.

Still further, the signal flows of FIG. 5 are described as being initiated by the chair/p1 402. However, the signal flows, in other embodiments could equally have been initiated by a participant to the conference (e.g., bridge 406) or a third party (e.g., an operator) or triggered by a computing device (e.g., web server).

Figure 6A:
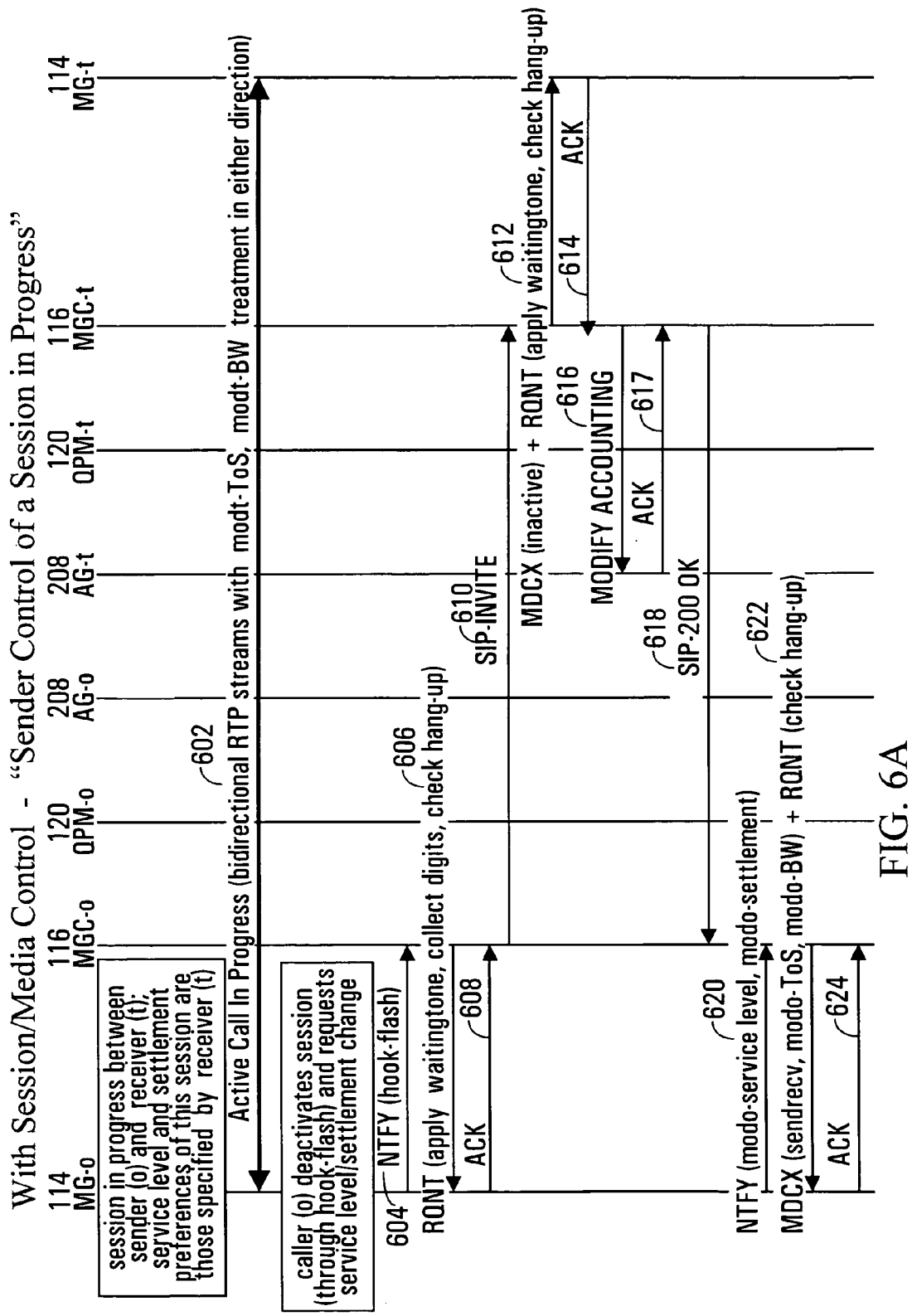
FIG. 6A and FIG. 6B, is a second signal flow diagram of signals transmitted across the networks of FIG. 2.
Figure 6B:
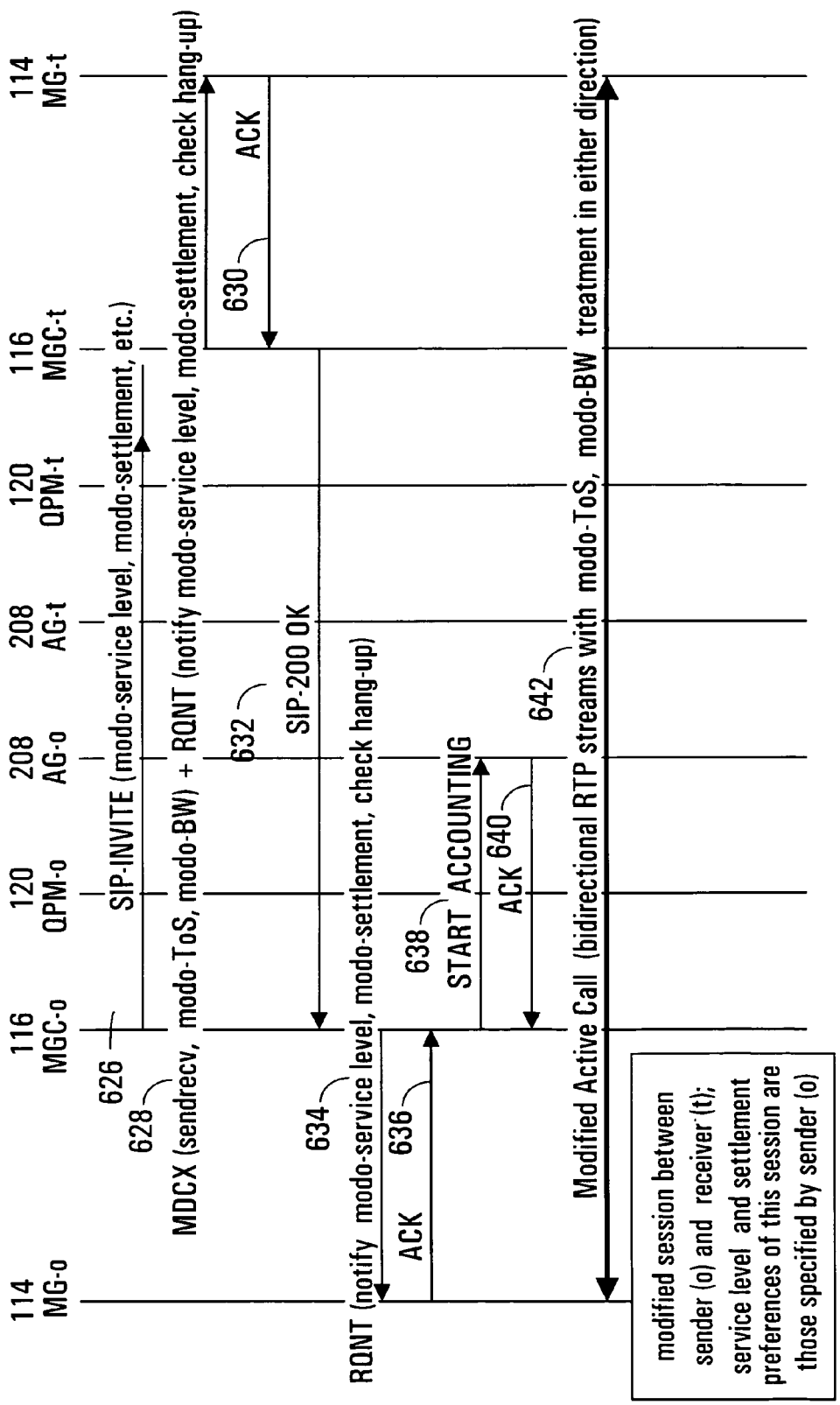

A further embodiment of the invention is illustrated by the signal flows of FIG. 6. The signal flows of FIG. 6 (which includes FIGS. 6A and 6B which have been separated due to space restrictions) may be implemented on system 200 of FIG. 2. In this scenario, the calling station controls the service level and settlement procedures for an "in-progress" session. FIG. 6 illustrates the signal flows that occur after a bi-directional Active Call 602 has been set up and a request is made by a station to modify the service level and/or settlement procedure. In the exemplary signal flows of FIG. 6, calling station 106 requests both a modification of the service level and modification of the settlement procedure associated with Active Call 602 so that the costs associated with modified active call will be allocated to the calling station 106. As will be appreciated by those of ordinary skill in the art, the signal flows illustrated in FIG. 6 could, if desired, be appended to the signal flows illustrated in FIG. 3.

Active Call 602 is a bi-directional communication session with the service level and settlement procedure specified by terminating/called station 108 (i.e., mod-t-service level implement t-ToS and t-BW, and mod-t-settlement). Signals 604–618 are used to place Active Call 602 "on hold" while signals 620–640 actually modify the bi-directional communication session.

Initially, calling station 106 transmits a notice using conventional methods (e.g., flash-hook, transmitting data from a computer, etc.) indicating that modification of the service level and/or settlement procedure is desired. Upon receipt of this notice, MG-o 114 transmits NTFY message 604 to MGC-o 116 indicating receipt of the notice (in the example, the notice was transmitted by a flash-hook). MGC-o 116 responds by transmitting RQNT message 606 to MG-o 114 requesting notification of application of a waiting tone to calling station 106 and notification if calling station 106 has terminated the call or dialled additional digits. The additional digits may be used to provide additional information regarding service level and settlement procedures. Once waiting tone has been applied (and, if necessary, digits collected), MG-o 114 transmits ACK message 608 to MGC-o 116.

On receipt of ACK 608, MGC-o 116 transmits to MGC-t 116 a SIP-Invite message 610. Message 610 indicates to MGC-t 116 to deactivate the connection between the stations 106, 108. Responsive to message 610, MGC-t 116 transmits to MG-t 114 MDCX message 612 which instructs MG-t 114 to temporarily inactivate the connection associated with Active Call 602 while the modifications are implemented. Message 612 further instructs MG-t 114 to inform called station 108 that Active Call 602 is being temporarily inactivated and to ensure that called station 108 has not terminated the call. Called station 108 may be informed of the temporary inactivation of Active Call 602 by the application of, for example, waiting tones, voice message, a message displayed on a computer or other conventional methods.

Once MG-t 114 has carried out the instructions of MGC-t 116, as indicated by message 612, MG-t 114 responds to MGC-t 116 by transmitting ACK 614. Upon receipt of ACK 614, MGC-t 116 is assured that the Active Call 602 has been temporarily inactivated. Since Active Call 602 has been inactivated, any cost consequences of the call should also be terminated. The termination of the costs associated with Active Call 602 may be performed by MGC-t 116 transmitting to AG-t 208 MODIFY ACCOUNTING message 616. Once accounting of the call has ceased, AG-t 208 transmits to MGC-t 116 ACK message 617.

Upon receipt of ACK 617, MGC-t 116 transmits to MGC-o 116 a SIP-200 OK message 618 which indicates to MGC-o 116 that the connection on MG (MG-t 114) has been inactivated.

At some point in time subsequent to MG-o 114 receiving notice that calling station 106 desires modification of the connection between the stations (e.g., through a hook-flash), MG-o 114 receives the requested new or modified service level and/or settlement procedure requested. In the example illustrated by FIG. 6, calling station 106 requests modification of both the service level and the settlement procedure. The modification request may be received using dialled digits, a conventional IVR, voice recognition, computer message data or the like. MG-o 114 notifies MGC-o 116 upon receipt of the requested service level and/or settlement procedure by transmitting to MGC-o 116 NTFY message 620 indicating the requested level or procedure (mod-o-service level, mod-o-settlement). Optionally, a query may be transmitted to QPM-o 208 by MGC-o 116 upon receipt of message 620 to determine if the service level and/or settlement procedure requested is/are permitted.

Responsive to receipt of message 620, MGC-o 116 instructs MG-o 114 to modify the connection on MG-o 114 to a send and receive connection having a modified ToS and BW (mod-o-ToS, mod-o-BW) reflective of the requested service level (mod-o-service level) and requests that MG-o 114 check that calling station 106 has not terminated the call. These instructions are transmitted by MGC-o 116 to MG-o 114 by message 622. Upon receipt and performance of the instructions, MG-o 114 responds by transmitting ACK message 624 to MGC-o 116.

In response to receipt of message 624, MGC-o 116 transmits SIP-Invite message 626 to MGC-t 114 indicating the modifications requested by calling station 106 (i.e., mod-service level, mod-settlement). Responsive to message 626, MGC-t 116 instructs (i.e., a MDCX message is transmitted) MG-t 114 to modify the connection on MG-t 114 to a send and receive connection having the requested service level (i.e., mod-o-ToS, mod-o-BW). MGC-t 116 also transmits a request for notification (RQNT) to inform the called station of the modification made to the service level and settlement procedures and if the called station 108 has hung up. The MDCX and RQNT instructions are transmitted by MGC-t 116 to MG-t 114 in message 628. Once MG-t 114 has performed the requested modifications, ACK message 630 is transmitted to MGC-t 114.

On receipt of ACK 630, MGC-t 114 transmits SIP-200 message 632 to MGC-o 116. Message 632 indicates to MGC-o 114 that the connection on MG (i.e., MG-t 114) having the requested service level has been set up. Responsive to the receipt of message 632, MGC-o 116 calling station 106 via MG-o 114 by RQNT message 634 that the called station b 108 has had its connection modified. Upon receipt of message 634, and if calling station 106 has not terminated the call, MG-o 114 transmits to MGC-O 116 ACK message 636.

On receipt of ACK 636, MGC-o 116 instructs AG-o 120 to commence accounting for the costs of Modified Active Call 642 by transmitting START ACCOUNTING message 638 in accordance with the request of calling station 106. Once accounting has commenced, AG-o 120 transmits to MGC-o 116 ACK 640.

As a result of messages 604–640 (FIGS. 6A and 6B), Modified Active Call 642 has been established having the ToS and BW that are associated with the service level requested by calling station 106. Moreover, the costs for the modified service level are now being allocated to calling station 106—also as requested.

MDCX and CRCX messages, described above, in addition to modifying or creating a connection with specified ToS/BW parameters, could also be used to request that an MG set-up or configure quality of service parameters at layers 1 to 3 (e.g., optical lambda wavelengths, Ethernet 802.1p, ATM virtual connection, Multiprotocol Label Switching switched path selection, IP diffserv, etc.) or other known methods.

While FIG. 1 illustrates a trunk to trunk session (across a single domain), which could also be applied (as described above) to a trunk to trunk session across two domains, it will be appreciated by a person of ordinary skill in the art that the description herein could also be applied to a trunk to line session.

Some calling/called stations may be associated with a subscriber such that the desired services are accessed whenever the stations are used. Also, a subscriber could access the desired services through any telephone station by, for example, using a dial-in number and an identification code (e.g., a Personal Identification Number—PIN).

It is contemplated that embodiments of the invention may be applied to communication between a media gateway and a station so as to provide dynamic service levels and/or settlement procedures for the access network portion illustrated in FIGS. 2 and 4. It is further contemplated that embodiments of the invention may be applied to a network node that operates as a combination of a station and media gateway.

While one (or more) embodiment(s) of this invention has been illustrated in the accompanying drawings and described above, it will be evident to those skilled in the art that changes and modifications may be made therein without departing from the invention. All such modifications or variations are believed to be within the scope of the invention as defined by the claims appended hereto.

What is claimed is:

1. A media gateway in a packet network, said media gateway providing communication between a first station and said packet network and a second media gateway providing communication between a second station and said packet network, said media gateway adapted to:
   allocate resources for said first station, said resources forming a first connection providing communication from said media gateway over said packet network to said second media gateway, said first connection adapted to provide a first service level;
   transmit a request for communication with said second station, said request providing network connection information about said first connection and said first service level;
   receive a message providing network connection information about a second connection and a second service level, said second service level associated with said second connection, said second connection providing communication between said second media gateway and said packet network;
   modify said first connection to provide said second service level;
   transmit data received from said first station destined for said second station to a network address of said second media gateway using said first connection; and
   transmit data received from said second station destined for said first station to a network address of said first media gateway using said second connection.

2. The media gateway of claim 1 further configured to:
   prior to said allocating, receiving a service request from said first station, said service request requesting said first level of service; and
   wherein said allocating is responsive to said service request received.

3. The media gateway of claim 1 wherein said service request further comprises a request for a settlement procedure for said modification of said first connection; and further comprising transmitting a settlement message requesting that costs of associating said first connection with said second service level be allocated according to said settlement procedure.

4. The media gateway of claim 1 wherein said media gateway and said second media gateway are serviced by a single media gateway controller.

5. The media gateway of claim 1 further configured to:
   receive a modification request triggered by one of said first station, said second media gateway, a media gateway controller, said second station and a third party; and
   modify said first connection responsive to said modification request.

6. The media gateway of claim 1 further configured to:
   receive a modification request from a media gateway controller; and
   modify said first connection responsive to said modification request.

7. A media gateway controller in a data network, said media gateway controller for establishing communication between a first media gateway and a second media gateway over a packet network, said first media gateway servicing a first station and said second media gateway servicing a second station, said media gateway controller configured to:
   receive a request from said first media gateway, said request requesting a level of service for a connection for communication between said first media gateway and said second media gateway, an address for a second station and a first network address associated with said connection terminating at said first media gateway, said first station subscribing to a subscription level of service different from said level of service requested;
   transmit a communication request to said second media gateway, said communication request requesting said second media gateway allocate resources for communication between said second media gateway and said first media gateway over said packet network for said connection;
   receive from said second media gateway a network address associated with said connection terminating at said second media gateway;
   transmit to said first media gateway a response to said request, said response indicating a level of service to be provided to said first station in view of said service level requested; and said connection comprising an upstream connection for transmissions from said first media gateway to said second media gateway and a downstream connection for transmissions from said second media gateway to said first media gateway.

8. The media gateway controller of claim 7 wherein said media gateway controller communicates with said second media gateway via a second media gateway controller.

9. The media gateway controller of claim 7 wherein said service level provided for said upstream connection is different from said service level provided for said downstream connection.

10. The media gateway controller of claim 7 further configured to:
  receive a request to modify said connection, said request indicating modification of at least one of:
  said level of service of said upstream connection; said level of service of said downstream connection; and allocation of costs of said connection.

11. The media gateway controller of claim 7 wherein said first media gateway and said second media gateway are serviced by said media gateway controller.

12. The media gateway controller of claim 7 wherein said level of service to be provided is different from: said requested level of service; and said subscription level of service.

13. The media gateway controller of claim 7 further configured to:
  transmit to said first media gateway a message requesting modification of said level of service of said connection to be provided to said first station, said modification modifying said level of service to be provided to said requested level of service.

14. A computer readable media containing software for a media gateway in a packet network, said media gateway communicating with a first station and said packet network and a second media gateway communicating with a second station and said packet network, said computer readable media configuring said media gateway to:
  allocate resources to said first station, said resources forming a first communication connection providing communication between said media gateway and said packet network, said first communication connection configured to provide a fist service level;
  transmit a request for communication with said second station, said request providing network connection information about said first communication connection and said fist service level;
  receive a message providing network connection information about a second communication connection and a second service level, said second service level associated with said second communication connection, said second communication connection providing communication between said second media gateway and said packet network;
  receive confirmation of modification of said first connection, said modification adapting said first connection to provide said second service level;
  transmit data received from said first station and destined for said second station using said first communication connection; and
  transmit data received from said second station and destined for said first station using said second communication connection.

15. A method for providing communications over a packet network between a first station and a second station, said method comprising, at a first media gateway in said packet network:
  allocating resources for said first station, said resources forming a first connection providing communication from said first media gateway over said packet network to a second media gateway in said packet network, said first connection adapted to provide a first service level;
  transmitting a request for communication with said second station, said request providing network connection information about said first connection and said first service level;
  receiving a message providing network connection information about a second connection and a second service level, said second service level associated with said second connection, said second connection providing communication between said second media gateway and said packet network;
  modifying said first connection to provide said second service level;
  transmitting data received from said first station destined for said second station to a network address of said second media gateway using said first connection; and
  transmitting data received from said second station destined for said first station to a network address of said first media gateway using said second connection.

16. The method of claim 15 further comprising:
  prior to said allocating, receiving a service request from said first station, said service request requesting said first level of service; and
  wherein said allocating is responsive to said service request received.

17. The method of claim 15 wherein said service request further comprises a request for a settlement procedure for said modification of said first connection; and further comprising transmitting a settlement message requesting that costs of associating said first connection with said second service level be allocated according to said settlement procedure.

18. The method of claim 15 further comprising:
  receiving a modification request triggered by one of said first station, said second media gateway, a media gateway controller, said second station and a third party; and
  modifying said first connection responsive to said modification request.

19. The method of claim 15 further comprising:
  receiving a modification request from a media gateway controller; and
  modifying said first connection responsive to said modification request.

20. A method for providing communications between a first station and a second station, said method comprising, at a media gateway controller:
  receiving a request from a first media gateway servicing said first station, said request requesting a level of service for a connection for communication between said first media gateway and a second media gateway servicing said second station, an address for a second station and a first network address associated with said connection terminating at said first media gateway, said first station subscribing to a subscription level of service different from said level of service requested;
  transmitting a communication request to said second media gateway, said communication request requesting said second media gateway allocate resources for communication between said second media gateway and said first media gateway over said packet network for said connection;

receiving from said second media gateway a network address associated with said connection terminating at said second media gateway;

transmitting to said first media gateway a response to said request, said response indicating a level of service to be provided to said first station in view of said service level requested; and said connection comprising an upstream connection for transmissions from said first media gateway to said second media gateway and a downstream connection for transmissions from said second media gateway to said first media gateway.

21. The method of claim 20 wherein said transmitting a communication request to said second media gateway is performed via a second media gateway controller.

22. The method of claim 20 wherein said service level provided for said upstream connection is different from said service level provided for said downstream connection.

23. The method of claim 20 further comprising:

receiving a request to modify said connection, said request indicating modification of at least one of: said level of service of said upstream connection; said level of service of said downstream connection; and allocation of costs of said connection.

24. The method of claim 20 wherein said first media gateway and said second media gateway are serviced by said media gateway controller.

25. The method of claim 20 wherein said level of service to be provided is different from: said requested level of service; and said subscription level of service.

26. The method of claim 20 further comprising:

transmitting to said first media gateway a message requesting modification of said level of service of said connection to be provided to said first station, said modification modifying said level of service to be provided to said requested level of service.

* * * * *

UNITED STATES PATENT AND TRADEMARK OFFICE
CERTIFICATE OF CORRECTION

PATENT NO.   : 6,944,166 B1
DATED        : September 13, 2005
INVENTOR(S)  : Perinpanathan et al.

It is certified that error appears in the above-identified patent and that said Letters Patent is hereby corrected as shown below:

Column 5,
Line 40, replace "MAEGACO" with -- MEGACO --.

Column 23,
Lines 56 and 61, replace "adapted to:" with -- configured to: --.

Column 25,
Lines 46 and 50, replace "fist" with -- first --.

Column 26,
Line 9, replace "adapted to" with -- configured to --.

Signed and Sealed this

Tenth Day of January, 2006

JON W. DUDAS
*Director of the United States Patent and Trademark Office*